United States Patent
Ramaswamy

(10) Patent No.: US 8,763,022 B2
(45) Date of Patent: Jun. 24, 2014

(54) SYSTEMS AND METHODS TO WIRELESSLY METER AUDIO/VISUAL DEVICES

(75) Inventor: Arun Ramaswamy, Tampa, FL (US)

(73) Assignee: Nielsen Company (US), LLC, Schaumburg, IL (US)

(*) Notice: Subject to any disclaimer, the term of this patent is extended or adjusted under 35 U.S.C. 154(b) by 467 days.

(21) Appl. No.: 12/088,798

(22) PCT Filed: Dec. 12, 2006

(86) PCT No.: PCT/US2006/061917
§ 371 (c)(1),
(2), (4) Date: Feb. 27, 2009

(87) PCT Pub. No.: WO2007/070789
PCT Pub. Date: Jun. 21, 2007

(65) Prior Publication Data
US 2009/0222848 A1    Sep. 3, 2009

Related U.S. Application Data

(60) Provisional application No. 60/749,443, filed on Dec. 12, 2005.

(51) Int. Cl.
*H04H 60/32* (2008.01)
(52) U.S. Cl.
USPC ........ 725/18; 725/9; 725/10; 725/11; 725/12; 725/13; 725/14; 725/15; 725/16; 725/17; 725/19; 725/20; 725/21; 455/418
(58) Field of Classification Search
None
See application file for complete search history.

(56) References Cited

U.S. PATENT DOCUMENTS

| | | | |
|---|---|---|---|
| 3,372,233 A | 3/1968 | Currey |
| 3,845,391 A | 10/1974 | Crosby |
| 3,919,479 A | 11/1975 | Moon et al. |
| 4,025,851 A | 5/1977 | Haselwood et al. |
| 4,027,332 A | 5/1977 | Wu et al. |
| 4,060,695 A | 11/1977 | Suzuki et al. |
| 4,230,990 A | 10/1980 | Lert, Jr. et al. |
| 4,283,601 A | 8/1981 | Nakajima et al. |
| 4,449,189 A | 5/1984 | Feix et al. |

(Continued)

FOREIGN PATENT DOCUMENTS

| | | |
|---|---|---|
| AU | 2005251196 | 12/2005 |
| CA | 2539442 | 4/2005 |

(Continued)

OTHER PUBLICATIONS

Chinese Patent Office, Office Action issued for Chinese Patent Application No. 200680052652.3 (including English language translation), issued on Feb. 5, 2010, 33 pages.

(Continued)

*Primary Examiner* — Joshua Taylor
(74) *Attorney, Agent, or Firm* — Hanley, Flight & Zimmerman, LLC

(57) ABSTRACT

Example systems and methods to wirelessly meter audio/visual (A/V) devices are disclosed. A disclosed example method receives media content from an A/V source device, embeds a video overlay in the wirelessly received media content, and wirelessly transmits the media content and the video overlay to the wireless A/V device. The example method wirelessly receives audience identification information in response to the transmitted video overlay, and wirelessly receives audience behavior information.

28 Claims, 11 Drawing Sheets

(56) References Cited

U.S. PATENT DOCUMENTS

| | | |
|---|---|---|
| 4,574,304 A | 3/1986 | Watanabe et al. |
| 4,599,644 A | 7/1986 | Fischer |
| 4,622,583 A | 11/1986 | Watanabe et al. |
| 4,633,302 A | 12/1986 | Damoci |
| 4,639,779 A | 1/1987 | Greenberg |
| 4,644,509 A | 2/1987 | Kiewit et al. |
| 4,697,209 A | 9/1987 | Kiewit et al. |
| 4,739,398 A | 4/1988 | Thomas et al. |
| 4,750,034 A | 6/1988 | Lem |
| 4,764,808 A | 8/1988 | Solar |
| 4,792,864 A | 12/1988 | Watanabe et al. |
| 4,839,919 A | 6/1989 | Borges et al. |
| 4,843,562 A | 6/1989 | Kenyon et al. |
| 4,847,685 A | 7/1989 | Gall et al. |
| 4,856,067 A | 8/1989 | Yamada et al. |
| 4,876,617 A | 10/1989 | Best et al. |
| 4,907,079 A | 3/1990 | Turner et al. |
| 4,931,871 A | 6/1990 | Kramer |
| 4,945,412 A | 7/1990 | Kramer |
| 4,947,436 A | 8/1990 | Greaves et al. |
| 5,003,591 A | 3/1991 | Kauffman et al. |
| 5,019,899 A | 5/1991 | Boles et al. |
| 5,023,929 A | 6/1991 | Call |
| 5,087,977 A | 2/1992 | Suizu |
| 5,113,437 A | 5/1992 | Best et al. |
| 5,138,659 A | 8/1992 | Kelkar et al. |
| 5,165,069 A | 11/1992 | Vitt et al. |
| 5,229,764 A | 7/1993 | Matchett et al. |
| 5,250,745 A | 10/1993 | Tsumura |
| 5,267,323 A | 11/1993 | Kimura |
| 5,294,977 A | 3/1994 | Fisher et al. |
| 5,369,440 A | 11/1994 | Sussman |
| 5,374,951 A | 12/1994 | Welsh |
| 5,379,345 A | 1/1995 | Greenberg |
| 5,404,161 A | 4/1995 | Douglass et al. |
| 5,412,738 A | 5/1995 | Brunelli et al. |
| 5,425,100 A | 6/1995 | Thomas et al. |
| 5,436,653 A | 7/1995 | Ellis et al. |
| 5,481,294 A | 1/1996 | Thomas et al. |
| 5,495,282 A | 2/1996 | Mostafa et al. |
| 5,504,518 A | 4/1996 | Ellis et al. |
| 5,512,933 A | 4/1996 | Wheatley et al. |
| 5,543,856 A | 8/1996 | Rosser et al. |
| 5,572,246 A | 11/1996 | Ellis et al. |
| 5,583,784 A | 12/1996 | Kapust et al. |
| 5,592,548 A | 1/1997 | Sih |
| 5,610,653 A | 3/1997 | Abecassis |
| 5,611,019 A | 3/1997 | Nakatoh et al. |
| 5,612,729 A | 3/1997 | Ellis et al. |
| 5,621,454 A | 4/1997 | Ellis et al. |
| 5,629,739 A | 5/1997 | Dougherty |
| 5,630,203 A | 5/1997 | Weinblatt |
| 5,675,510 A | 10/1997 | Coffey et al. |
| 5,676,282 A | 10/1997 | Satterfield |
| 5,699,276 A | 12/1997 | Roos |
| 5,734,444 A | 3/1998 | Yoshinobu |
| 5,764,763 A | 6/1998 | Jensen et al. |
| 5,765,130 A | 6/1998 | Nguyen |
| 5,768,680 A | 6/1998 | Thomas |
| 5,774,564 A | 6/1998 | Eguchi et al. |
| 5,796,952 A | 8/1998 | Davis et al. |
| 5,809,041 A | 9/1998 | Shikakura et al. |
| 5,815,297 A | 9/1998 | Ciciora |
| 5,815,671 A | 9/1998 | Morrison |
| 5,848,396 A | 12/1998 | Gerace |
| 5,850,249 A | 12/1998 | Massetti et al. |
| 5,872,588 A | 2/1999 | Aras et al. |
| 5,881,360 A | 3/1999 | Fong |
| 5,889,548 A | 3/1999 | Chan |
| 5,905,865 A | 5/1999 | Palmer et al. |
| 5,907,366 A | 5/1999 | Farmer et al. |
| 5,914,746 A | 6/1999 | Matthews, III et al. |
| 5,933,646 A | 8/1999 | Hendrickson et al. |
| 5,963,914 A | 10/1999 | Skinner et al. |
| 5,966,120 A | 10/1999 | Arazi et al. |
| 6,031,577 A | 2/2000 | Ozkan et al. |
| 6,118,873 A | 9/2000 | Lotspiech et al. |
| 6,259,443 B1 | 7/2001 | Williams, Jr. |
| 6,286,140 B1 | 9/2001 | Ivanyi |
| 6,308,327 B1 | 10/2001 | Liu et al. |
| 6,353,929 B1 | 3/2002 | Houston |
| 6,473,903 B2 | 10/2002 | Balakrishnan et al. |
| 6,513,161 B2 | 1/2003 | Wheeler et al. |
| 6,523,175 B1 | 2/2003 | Chan |
| 6,560,349 B1 | 5/2003 | Rhoads |
| 6,647,548 B1 | 11/2003 | Lu et al. |
| 6,675,383 B1 | 1/2004 | Wheeler et al. |
| 6,735,775 B1 | 5/2004 | Massetti |
| 6,738,978 B1 | 5/2004 | Hendricks et al. |
| 6,751,221 B1 | 6/2004 | Saito et al. |
| 6,816,850 B2 | 11/2004 | Culliss |
| 6,885,643 B1 | 4/2005 | Teramoto et al. |
| 7,039,932 B2 | 5/2006 | Eldering |
| 7,155,159 B1 | 12/2006 | Weinblatt et al. |
| 7,239,981 B2 | 7/2007 | Kolessar et al. |
| 7,316,025 B1 | 1/2008 | Aijala et al. |
| 7,353,171 B2 | 4/2008 | Srinivasan |
| 7,421,723 B2 | 9/2008 | Harkness et al. |
| 7,440,674 B2 | 10/2008 | Plotnick et al. |
| 7,454,776 B1 | 11/2008 | Walker et al. |
| 7,523,474 B2 | 4/2009 | Herley |
| 7,774,807 B2 | 8/2010 | Wheeler et al. |
| 7,958,526 B2 | 6/2011 | Wheeler et al. |
| 2001/0056573 A1 | 12/2001 | Kovac et al. |
| 2002/0026635 A1 | 2/2002 | Wheeler et al. |
| 2002/0100055 A1* | 7/2002 | Zeidman ........................ 725/110 |
| 2002/0124246 A1 | 9/2002 | Kaminsky et al. |
| 2002/0144262 A1 | 10/2002 | Plotnick et al. |
| 2002/0194592 A1 | 12/2002 | Tsuchida et al. |
| 2003/0039465 A1 | 2/2003 | Bjorgan et al. |
| 2003/0110485 A1 | 6/2003 | Lu et al. |
| 2003/0110503 A1 | 6/2003 | Perkes |
| 2003/0112974 A1* | 6/2003 | Levy ............................. 380/210 |
| 2004/0019463 A1 | 1/2004 | Kolessar et al. |
| 2004/0058675 A1* | 3/2004 | Lu et al. ...................... 455/418 |
| 2004/0073916 A1 | 4/2004 | Petrovic et al. |
| 2004/0088721 A1 | 5/2004 | Wheeler et al. |
| 2004/0132481 A1 | 7/2004 | Sugaya |
| 2005/0028189 A1 | 2/2005 | Heine et al. |
| 2005/0033758 A1 | 2/2005 | Baxter |
| 2005/0071863 A1* | 3/2005 | Matz et al. ........................ 725/9 |
| 2005/0135614 A1* | 6/2005 | Hollar et al. ................... 380/201 |
| 2005/0160258 A1 | 7/2005 | O'Shea et al. |
| 2005/0181722 A1 | 8/2005 | Kopra et al. |
| 2005/0198151 A1* | 9/2005 | Thorson ........................ 709/206 |
| 2005/0216509 A1 | 9/2005 | Kolessar et al. |
| 2005/0267750 A1 | 12/2005 | Steuer et al. |
| 2006/0100868 A1 | 5/2006 | Hetherington et al. |
| 2006/0195861 A1 | 8/2006 | Lee |
| 2006/0224552 A1 | 10/2006 | Riezler et al. |
| 2007/0028273 A1* | 2/2007 | Zanaty ............................ 725/63 |
| 2007/0055987 A1 | 3/2007 | Lu et al. |
| 2007/0061830 A1 | 3/2007 | Chang |
| 2007/0162927 A1 | 7/2007 | Ramaswamy et al. |
| 2008/0007658 A1 | 1/2008 | Kodama |
| 2010/0115573 A1 | 5/2010 | Srinivasan et al. |
| 2010/0268540 A1 | 10/2010 | Arshi et al. |
| 2010/0268573 A1 | 10/2010 | Jain et al. |
| 2010/0333126 A1 | 12/2010 | Wheeler et al. |
| 2011/0224992 A1 | 9/2011 | Chaoui et al. |
| 2012/0102518 A1 | 4/2012 | Wheeler et al. |

FOREIGN PATENT DOCUMENTS

| | | |
|---|---|---|
| CN | 1230315 | 9/1999 |
| EP | 0161512 | 11/1985 |
| EP | 0195639 | 9/1986 |
| EP | 0210609 | 2/1987 |
| EP | 0245037 | 11/1987 |
| EP | 0283570 | 9/1988 |
| EP | 0598398 | 5/1994 |
| EP | 0687083 | 12/1995 |
| EP | 0703683 | 3/1996 |
| EP | 0985287 | 3/2000 |

(56) References Cited

FOREIGN PATENT DOCUMENTS

| | | |
|---|---|---|
| FR | 2555383 | 5/1985 |
| FR | 2717025 | 9/1995 |
| GB | 2138642 | 10/1984 |
| GB | 2170080 | 7/1986 |
| JP | 63084396 | 4/1988 |
| JP | 1177796 | 7/1989 |
| JP | 5327639 | 12/1993 |
| JP | 7255069 | 10/1995 |
| JP | 11275032 | 10/1999 |
| KR | 930006665 | 7/1933 |
| TW | 200516467 | 5/2005 |
| WO | 8810540 | 12/1988 |
| WO | 9111062 | 7/1991 |
| WO | 9322878 | 11/1993 |
| WO | 9512278 | 5/1995 |
| WO | 9641495 | 12/1996 |
| WO | 9831155 | 7/1998 |
| WO | 9959275 | 11/1999 |
| WO | 9962260 | 12/1999 |
| WO | 0004662 | 1/2000 |
| WO | 0016552 | 3/2000 |
| WO | 03094499 | 11/2003 |
| WO | 2005025217 | 3/2005 |
| WO | 2005034395 | 4/2005 |
| WO | 2005119651 | 12/2005 |

OTHER PUBLICATIONS

International Searching Authority, "Written Opinion of the International Searching Authority of International application No. PCT/US 06/61917," Dec. 28, 2007, 8 pages.

International Searching Authority, "International Search Report for International application No. PCT/US06/61917," Dec. 28, 2007, 2 pages.

IP Australia, Examiner's First Report on Patent Application No. 2006325808, Apr. 29, 2010, 2 pages.

Australian Patent Office, AU Examiner's report No. 2 on patent application No. 2006325808, dated May 20, 2011, 3 pages.

Chinese Patent Office, Office action issued in Chinese Patent Application No. 200680052652.3 (English translation), issued on Jan. 26, 2011, 11 pages.

Chinese Patent Office, "Fourth Office Action," with English translation, issued in connection with Chinese application No. 2006800526523, issued Jun. 14, 2012, 4 pages.

International Preliminary Examining Authority, "Written Opinion," issued in connection with international application serial No. PCT/US97/09218, mailed Mar. 8, 1999, 6 pages.

International Preliminary Examining Authority, "International Preliminary Examination Report," issued in connection with international application serial No. PCT/US97/09218, mailed Apr. 21, 1999, 11 pages.

International Searching Authority, "International Search Report," issued in connection with international application serial No. PCT/US98/23558, mailed Aug. 27, 1999, 4 pages.

International Searching Authority, "International Search Report," issued in connection with international application serial No. PCT/US00/03829, mailed Aug. 18, 2000, 3 pages.

Australian Patent Office, "Examination Report," issued in connection with Australian application serial No. 31489/97, issued Mar. 2, 2000, 1 page.

Australian Patent Office, "Examination Report," issued in connection with Australian application serial No. 46028/01, issued Jun. 13, 2002, 1 page.

Australian Patent Office, "Examination Report," issued in connection with Australian application serial No. 82980/98, issued Jul. 24, 2000, 2 pages.

Australian Patent Office, "Examination Report," issued in connection with Australian application serial No. 2003262297, issued Jul. 6, 2005, 2 pages.

Australian Patent Office, "Examination Report," issued in connection with Australian application serial No. 31489/97, issued Mar. 21, 2001, 1 page.

Australian Patent Office, "Notice of Acceptance," issued in connection with Australian application serial No. 57832/01, issued Oct. 27, 2003, 2 pages.

Australian Patent Office, "Notice of Acceptance," issued in connection with Australian application serial No. 31489/97, issued May 30, 2001, 2 pages.

Australian Patent Office, "Notice of Acceptance," issued in connection with Australian application serial No. 57833/01, issued Dec. 3, 2002, 2 pages.

Australian Patent Office, "Notice of Acceptance," issued in connection with Australian application serial No. 57831/01, issued Sep. 9, 2003, 2 pages.

BBM, "The M Files," Picture Matching Technology Pt. 2, The Department of Intergalactic Audience Measurement, Nov. 15, 2000, 2 pages.

Canadian Intellectual Property Office, "Notice of Allowance," issued in connection with Canadian application serial No. 2,275,409, issued Oct. 11, 2005, 1 page.

Canadian Intellectual Property Office, "Office Action," issued in connection with Canadian application serial No. 2,275,409, issued Jan. 6, 2005, 2 pages.

Canadian Intellectual Property Office, "Office Action," issued in connection with Canadian application serial No. 2,275,409, issued May 10, 2004, 3 pages.

Canadian Intellectual Property Office, "Office Action," issued in connection with Canadian application serial No. 2,289,519, issued Jun. 16, 2000, 2 pages.

State Intellectual Property Office of P.R. China, "Grant Decision," issued in connection with Chinese application serial No. 97181455.4, issued May 21, 2004, 4 pages.

State Intellectual Property Office of P.R. China, "First Office Action," issued in connection with Chinese application serial No. 97181455.4, issued Jun. 7, 2002, 6 pages.

State Intellectual Property Office of P.R. China, "First Office Action," issued in connection with Chinese application serial No. 98806840.0, issued Oct. 25, 2002, 9 pages.

State Intellectual Property Office of P.R. China, "First Office Action," issued in connection with Chinese application serial No. 200310123387.1, issued Dec. 8, 2006, 8 pages.

State Intellectual Property Office of P.R. China, "Notice of Grant," issued in connection with Chinese application serial No. 98806840.0, issued Oct. 17, 2003, 5 pages.

State Intellectual Property Office of P.R. China, "Rejection Decision," issued in connection with Chinese application serial No. 200310123387.1, issued Oct. Apr. 4, 2008, 4 pages.

State Intellectual Property Office of P.R. China, "Second Office Action," issued in connection with Chinese application serial No. 97181455.4, issued Apr. 25, 2003, 9 pages.

State Intellectual Property Office of P.R. China, "Second Office Action," issued in connection with Chinese application serial No. 98806840.0, issued Apr. 25, 2003, 7 pages.

State Intellectual Property Office of P.R. China, "Second Office Action," issued in connection with Chinese application serial No. 200310123387.1, issued Aug. 3, 2007, 7 pages.

Canadian Intellectual Property Office, "Office Action," issued in connection with Canadian application serial No. 2,289,519, issued Feb. 9, 2000, 3 pages.

European Patent Office, "Office Communication," issued in connection with European application serial No. 98 933 309.1, issued Sep. 14, 2000, 4 pages.

European Patent Office, "Office Communication," issued in connection with European application serial No. 98 933 309.1, issued Apr. 23, 2001, 5 pages.

European Patent Office, "Office Communication," issued in connection with European application serial No. 00 114 271.0, issued Sep. 13, 2001, 4 pages.

European Patent Office, "Office Communication," issued in connection with European application serial No. 98 933 309.1, issued Mar. 15, 2000, 4 pages.

(56) References Cited

OTHER PUBLICATIONS

European Patent Office, "Intention to Grant," issued in connection with European application serial No. 00 114 272.8, issued Mar. 15, 2007, 4 pages.
European Patent Office, "Office Communication," issued in connection with European application serial No. 00 114 271.0, issued Jan. 7, 2003, 4 pages.
European Patent Office, "Office Communication," issued in connection with European application serial No. 00 114 272.8, issued Jun. 28, 2004, 4 pages.
European Patent Office, "Office Communication," issued in connection with European application serial No. 00 114 272.8, issued Jul. 3, 2001, 3 pages.
European Patent Office, "Office Communication," issued in connection with European application serial No. 98 933 309.1, issued Sep. 13, 2001, 3 pages.
European Patent Office, "Office Communication," issued in connection with European application serial No. 00 114 272.8, issued Nov. 28, 2002, 3 pages.
European Patent Office, "Intention to Grant," issued in connection with European application serial No. 98 933 309.1, issued Nov. 17, 2004, 11 pages.
European Patent Office, "Decision to Grant," issued in connection with European application serial No. 00 114 271.0, issued Apr. 21, 2005, 1 page.
European Patent Office, "Adjournment of Examination/Opposition Proceedings" issued in connection with European application serial No. 00 114 272.8, issued Apr. 11, 2006, 1 page.
European Patent Office, "European Search Report," issued in connection with European application serial No. 07 017 129.9, issued Apr. 9, 2009, 10 pages.
European Patent Office, "Provision of the Copy of Minutes," issued in connection with European application serial No. 00 114 271.0, issued Nov. 10, 2004, 7 pages.
European Patent Office, "Summons to Attend Oral Proceedings," issued in connection with European application serial No. 00 114 271.0, issued Mar. 11, 2004, 6 pages.
European Patent Office, "Summons to Attend Oral Proceedings," issued in connection with European application serial No. 98 933 309.1, issued Mar. 12, 2004, 7 pages.
Indian Patent Office, "Examination Report," issued in connection with Indian application serial No. 1812/MAS/98, issued Dec. 30, 2004, 3 pages.
Japanese Patent Office, "Notice of Allowance," issued in connection with Japanese application serial No. 2000-548980, mailed Mar. 10, 2009, 2 pages.
Japanese Patent Office, "Decision of Rejection," issued in connection with Japanese application serial No. 10-534297, mailed Sep. 20, 2003, 3 pages.
Japanese Patent Office, "Notice of Grounds for Rejection," issued in connection with Japanese application serial No. 10-534297, mailed May 13, 2003, 6 pages.
Japanese Patent Office, "Notice of Grounds for Rejection," issued in connection with Japanese application serial No. 2000-548980, mailed May 9, 2008, 6 pages.
Udrea et al., "Speech Enhancement Using Spectral Over-Subtraction and Residual Noise Reduction," IEEE, 2003, 4 pages.
United States Patent and Trademark Office, "Final Office Action," issued in connection with U.S. Appl. No. 12/505,966, mailed May 10, 2012, 21 pages.
United States Patent and Trademark Office, "Non-Final Office Action," issued in connection with U.S. Appl. No. 12/505,966, mailed Oct. 6, 2011, 31 pages.
Canadian Intellectual Property Office, "Notice of Allowance," issued in connection with Canadian application serial No. 2,574,998, issued Aug. 10, 2010, 1 page.
Canadian Intellectual Property Office, "Office Action," issued in connection with Canadian application serial No. 2,574,998, issued Nov. 13, 2009, 10 pages.
Canadian Intellectual Property Office, "Office Action," issued in connection with Canadian application serial No. 2,574,998, issued Aug. 26, 2008, 4 pages.
Canadian Intellectual Property Office, "Office Action," issued in connection with Canadian application serial No. 2,574,998, issued Mar. 23, 2009, 5 pages.
International Bureau, "International Preliminary Report on Patentability," issued in connection with international application serial No. PCT/US2005/026426, mailed Feb. 1, 2007, 9 pages.
International Searching Authority, "International Search Report," issued in connection with application serial No. PCT/US2005/026426, mailed Aug. 18, 2006, 3 pages.
International Searching Authority, "Written Opinion of the International Searching Authority," issued in connection with application serial No. PCT/US2005/026426, mailed Aug. 18, 2006, 7 pages.
United States Patent and Trademark Office, "Notice of Panel Decision from Pre-Appeal Brief Review," issued in connection with U.S. Appl. No. 11/618,245, mailed Jun. 13, 2012, 2 pages.
United States Patent and Trademark Office, "Final Office Action," issued in connection with U.S. Appl. No. 11/618,245, mailed Oct. 26, 2011, 38 pages.
United States Patent and Trademark Office, "Non-Final Office Action," issued in connection with U.S. Appl. No. 11/618,245, mailed Apr. 28, 2011, 48 pages.
United States Patent and Trademark Office, "Advisory Action," issued in connection with U.S. Appl. No. 11/618,245, mailed Sep. 30, 2009, 4 pages.
United States Patent and Trademark Office, "Final Office Action," issued in connection with U.S. Appl. No. 11/618,245, mailed Jul. 21, 2009, 31 pages.
United States Patent and Trademark Office, "Non-Final Office Action," issued in connection with U.S. Appl. No. 11/618,245, mailed Feb. 5, 2009, 48 pages.
Intellectual Property Office of P.R. China, "Fifth Office Action," issued in connection with Chinese application serial No. 2006800526523, issued Jan. 21, 2013, 7 pages.
European Patent Office, "Office Action," issued in connection with European application serial No. 07 017 129.3, issued Oct. 1, 2012, 5 pages.
Brazilian Patent Office, "Technical Examination Report," issued in connection with Brazilian application serial No. PI 9714323-5, issued Mar. 23, 2012, 4 pages.
International Searching Authority, "International Search Report," issued in connection with application serial No. PCT/US94/11795, mailed Feb. 24, 1995, 1 page.
International Searching Authority, "Written Opinion of the International Searching Authority," issued in connection with application serial No. PCT/US97/09218, mailed Jan. 26, 1998, 1 page.
Mexican Patent Office, "Office Action," with Redacted English Translation, in connection with Mexican application serial No. MX/a/2008/007596, issued Feb. 14, 2012, 4 pages.

\* cited by examiner

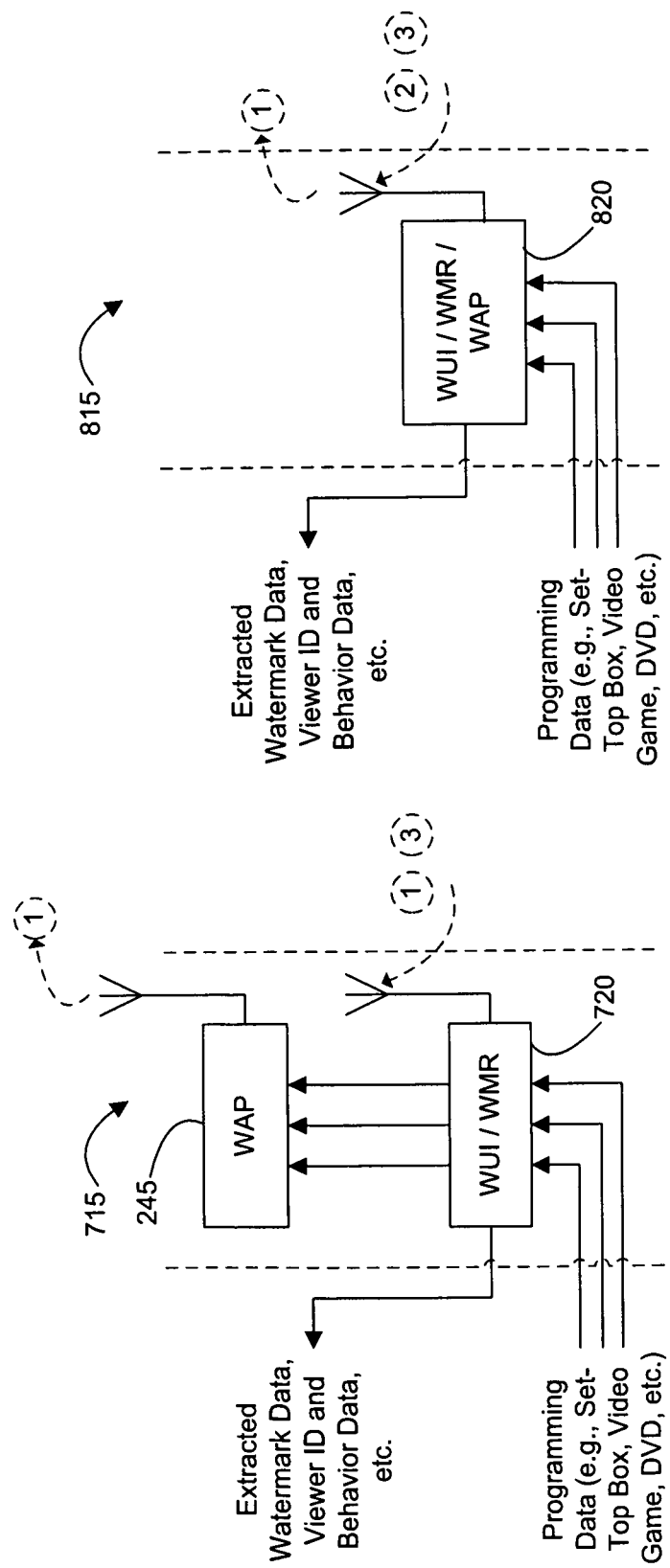

US 8,763,022 B2

SYSTEMS AND METHODS TO WIRELESSLY METER AUDIO/VISUAL DEVICES

RELATED APPLICATIONS

This patent arises from a 371 national stage of International Application Serial No. PCT/US2006/061917 filed on Dec. 12, 2006, which claims the benefit of U.S. Provisional Patent Application Ser. No. 60/749,443, filed on Dec. 12, 2005, entitled "Systems and Methods to Wirelessly Meter Audio/Visual Devices," and is hereby incorporated herein by reference in its entirety.

FIELD OF THE DISCLOSURE

The present disclosure relates generally to metering audio/visual (A/V) devices, and, more particularly, to systems and methods to wirelessly meter audio/visual devices.

BACKGROUND

Consuming media presentations generally involves listening to audio information and/or viewing video information such as, for example, radio programs, music, television programs, movies, still images, etc. Media-centric companies such as, for example, advertising companies, broadcasting networks, etc. are often interested in audience behavior, such as the viewing and listening interests of their audience. Measurement of such audience behavior allows the media-centric companies to better allocate their advertising expenditures and better market their products.

Audience measurement of television and/or radio programs has been practiced for many years. Audience measurement devices, installed in statistically selected households, typically collect tuning information (e.g., information indicating the content presented to the audience such as channel information, time of consumption information, program information, etc.) and people information (e.g., information about the demographics of the audience). Such information is gathered, recorded and combined to produce meaningful ratings data.

Tuning information is typically collected by a tuning meter, otherwise known as an active/passive (A/P) meter. The A/P meter collects the tuning data from devices, such as set-top boxes, video game devices, video cassette recorders (VCRs), digital video recorders (DVRs), and digital versatile disk (DVD) players, to name a few. In addition to collecting such tuning data, the A/P meter determines which of the several devices is feeding the television set. Channel and content information, as well as device source information, is sent to a backoffice for analysis. People information is typically collected by a People Meter (PM) such as a Nielsen People Meter provided by Nielsen Media Research. The PM collects various demographic information related to the viewer and the viewer's tuning behavior. Together the A/P meter and the PM collect and send information to enable television ratings to be determined. Such ratings information is useful for various business determinations, including setting the cost of commercial advertising time.

Traditional audience measurement is typically employed by wire-based (fixed) hardware devices. An audio/visual (A/V) device, such as a television, is hard-wired to a media source cable to provide broadcast content to an audience member. Audience measurement devices may be placed on or near the television to detect audio and/or video signals emitted by the television, thereby allowing the devices to determine audience behavior. Data acquired by the audience measurement devices is hardwired to a data collection facility by, for example, a telephone modem or a broadband modem to allow further analysis of the collected data. However, the traditional audience measurement devices do not accommodate audience measurement services when the A/V device is wireless, such as when the audience member(s) is using a wireless television.

BRIEF DESCRIPTION OF THE DRAWINGS

FIG. 7 is a block diagram of an alternate example implementation of the wireless interface of FIG. 1.

FIG. 8 is a block diagram of an additional alternate example implementation of the wireless interface of FIG. 1.

DETAILED DESCRIPTION

Figure 1:
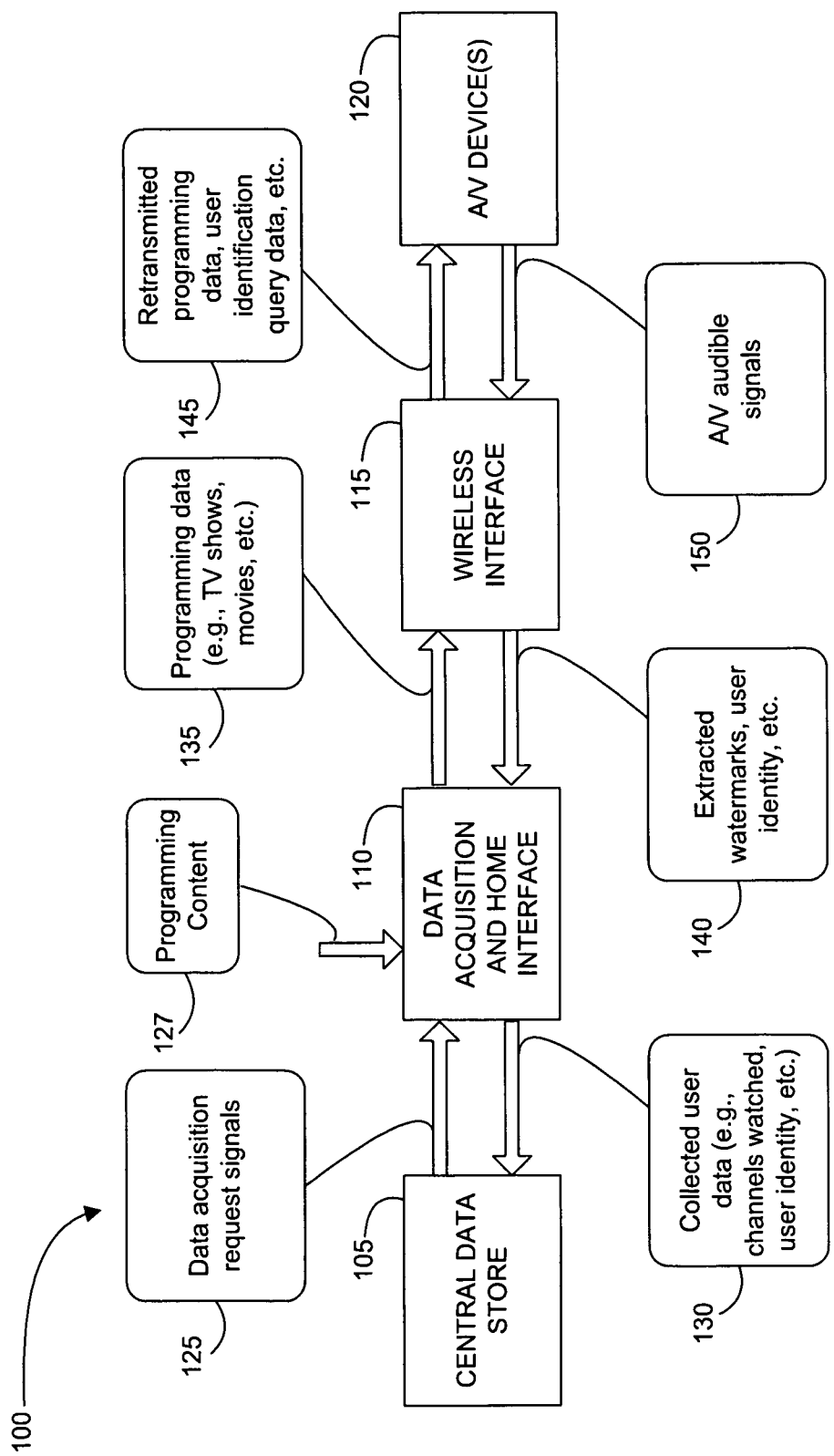
FIG. 1 is a block diagram of an example system to wirelessly meter an A/V device.

Referring now to FIG. 1, an example system 100 to wirelessly meter an audio/visual (A/V) device is shown. The system 100 of FIG. 1 includes a central data store 105, a data acquisition and home interface 110, a wireless interface 115, and an A/V device 120. The central data store 105 includes one or more databases, or other similar data storage devices, accessible by an entity interested in collecting A/V device user behavior information. Such user behavior information may include user identity, demographics, broadcast programming channels watched or listened-to, movies watched, and A/V device channel changes, to name a few. User information collected at the central data store 105 may be further analyzed at a backoffice, business, and/or marketing entity to determine, for example, broadcast program ratings and movie ratings. Ratings information may allow advertisers to determine, among other things, effective advertising strategies and advertising pricing.

As discussed in further detail below, the data acquisition and home interface 110 includes devices typically found in a user's home, such as a cable television set-top box, a VCR, a DVD player, a video game device, a satellite dish receiver, and various audio/visual devices (A/V devices) to name a few. Additionally, for households and viewers statistically selected by a ratings company, such as, for example, Nielsen Media Research, the data acquisition and home interface 110 may also include a ratings data meter or similar A/V data aggregator to collect and correlate data relating to users' behaviors. Further, the data acquisition and home interface 110 may also include a device for determining and collecting demographic data of the household viewers via an A/V data aggregator and/or user identification module/device (ID device), such as a Nielsen People Meter provided by Nielsen Media Research.

As discussed in further detail below, the wireless interface 115 includes interfaces to allow a user to receive content provided by the data acquisition and home interface 110. In particular, the wireless interface 115 permits the user to wirelessly transmit content from, for example, the set-top box, VCR, and/or DVD player of the data acquisition and home interface 110, to the wireless A/V device 120. In other words, the wireless interface 115 bridges the wireless gap between the user's standard A/V equipment (e.g., set-top box, VCR, DVD player, etc.) and the A/V device 120 (e.g., a television, a mobile television, etc.). As described below, the wireless interface 115 may include a wireless user identifier (WUI), a wireless access point (WAP), and a wireless microphone receiver (WMR) to wirelessly transmit A/V content and receive viewer behavior information, as discussed in further detail below.

The A/V device 120 includes one or more devices capable of providing A/V information to a user. The A/V device 120 may include, but is not limited to a television, a mobile television, a radio, and/or an entertainment center having audio and/or visual display devices. As the A/V devices are wireless, they are not constrained to use in an area proximate to the data acquisition and home interface 110.

In operation, the system 100 to wirelessly meter an A/V device of FIG. 1 allows the A/V device 120 to be located in a home or business without a constraint of traditional cable-based connectivity to the data acquisition and home interface 110. Such user freedom is provided, in part, by the wireless interface 115, which also permits collection of user behavior while the A/V device 120 is being used. The user behavior is further collected and/or accumulated by the data acquisition and home interface 110 and provided to the central data store 105 for further analysis. Because each of the central data store 105, data acquisition and home interface 110, wireless interface 115, and A/V device 120 are communicatively connected, various types of data is exchanged therein. For example, the central data store 105 sends data acquisition request signals 125 to the data acquisition and home interface 110 to initiate receipt of collected user data 130. The request signals 125 may be transmitted on a periodic basis and/or the data acquisition and home interface 110 may automatically transmit the collected user data 130 at predetermined intervals. Collected user data may include, but is not limited to channels watched and stations listened-to by a user of the A/V device 120, times and dates at which the user watched and/or listened, and an identity of the user. The data acquisition and home interface 110 also receives programming content 127 from various sources. For example, a cable television provider, a satellite service provider, and/or a local broadcast station may provide programming content 127 to the user.

Data 135 sent by the data acquisition and home interface 110 to the wireless interface 115 may include, but is not limited to, propagating content, such as viewer programs from television signals, satellite signals, cable signals, VCR A/V signals, DVD player A/V signals, and video game device A/V signals. The data 135 sent by the data acquisition and home interface 110 may also include watermarks embedded into audio and/or video portions of the various A/V signals. The watermarks may contain in-band codes of the programming transmission that identify the date and time of broadcast, program identification information, and/or identity information regarding the entity transmitting the program. Such watermarks are typically hidden into the audio and/or visual signal and are not perceptible to the A/V device user. In the event that a statistically selected household uses a wireless A/V device 120 (e.g., a mobile television), the wireless interface 115 allows the devices of the data acquisition and home interface 110 to transmit to the wireless A/V device 120. Data received 140 by the data acquisition and home interface 110 from the wireless interface 115 may include user identity information and extracted watermarks, as discussed further below.

Data 145 sent by the wireless interface 115 to the A/V device 120 may include retransmitted viewer programming data and user query messages, as discussed in further detail below. Data received 150 by the wireless interface 115 from the A/V device 120 may include audio signals emitted from the A/V device 120 and processed by the wireless interface 115. As users interact (e.g., change channels on the example television) with A/V devices 120, the A/V device output is modulated by the wireless interface 115 and retransmitted to the A/V device 120. As discussed in further detail below, the wireless interface 115 also sends user behavior data and program content information to the data acquisition and home interface 110. Additionally, the wireless interface 115 enables the system 100 to acquire demographics data from a A/V device user and send such data to the data acquisition and home interface 110, and then on to the central data store 105.

Figure 2:
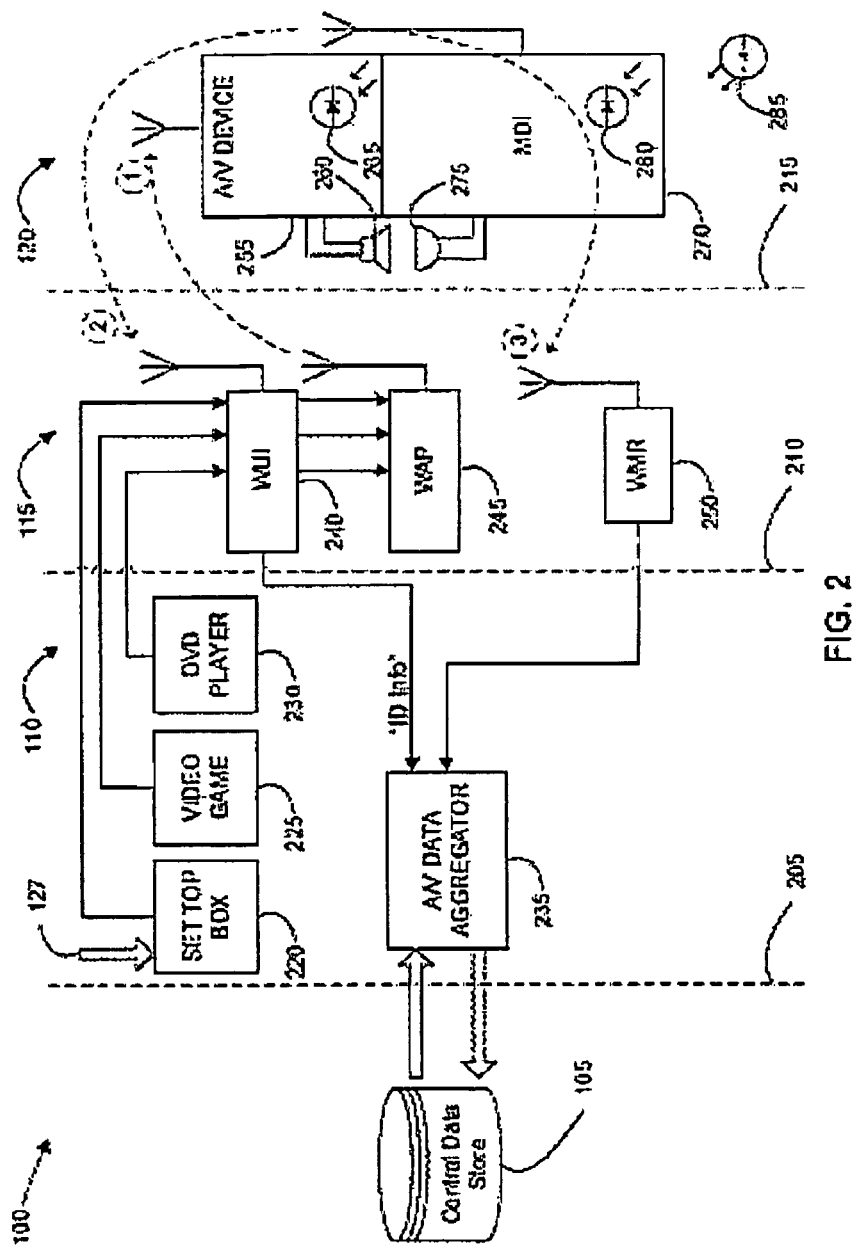
FIG. 2 is a block diagram illustrating further detail of one example implementation of the system of FIG. 1.

FIG. 2 illustrates further detail of one example implementation of the system 100 to wirelessly meter an A/V device of FIG. 1. Dashed-lines 205, 210, and 215 in FIG. 2 separate FIG. 2 into components corresponding to the central data store 105, the data acquisition and home interface 110, the wireless interface 115, and A/V device(s) 120, respectively.

The data acquisition and home interface 110 includes, as described above, various A/V devices, such as a set-top box 220, a video game console 225, and a DVD player 230. Such example A/V devices (220, 225, 230) provide various forms of audio and visual entertainment, information, and broadcast programs. As described above, the user may receive various forms of programming content 127, such as cable television, satellite programming, and/or programming via an antenna that is broadcast from one or more local television stations. The user may receive such programming content via the set-top box 220. The data acquisition and home interface 110 also includes an example A/V data aggregator 235 to collect user behavior and demographic information.

The wireless interface 115 includes a wireless user identifier (WUI) 240 for receiving A/V signals from the A/V devices (220, 225, 230) and embedding an identification query signal on the received A/V signals, as will be discussed in further detail below. The WUI 240 forwards the A/V signals, including the embedded query signal, to a wireless access point (WAP) 245 for wireless retransmission to a user's A/V devices 120. The wireless interface 115 also includes a wireless microphone receiver (WMR) 250 for receiving retransmitted audio signals from the A/V devices 120, as will be discussed in further detail below.

FIG. 2 also illustrates example A/V devices 120, such as a mobile A/V device 255. An example mobile A/V device 255 may include, for example, a mobile television that is unencumbered by wire-based data cables and/or power cables. However, the example A/V device 120 may also include a standard television that connects to data cables and/or power cables. The example mobile A/V device 255 may also include a speaker 260 to output audible signals to the user, and an infra-red (IR) receiver 265 to receive user commands (e.g., channel change, volume adjustment, power on/off, etc.). The A/V devices 120 may also include a mobile device interface (MDI) 270 for receiving audio signals from the mobile A/V device 255 via a microphone 275. The MDI 270 may also include an IR receiver 280, similar to that of the mobile A/V device 255, to receive user identification information from a user that is interacting with the mobile A/V device 255. The IR receiver 265 of the mobile A/V device 255 and the IR receiver 280 of the MDI 270 may each receive IR signals from an IR transmitter (remote control) 285.

A household with the metering system 100 of FIG. 2 includes bidirectional connectivity with the central data store 105. Bidirectional connectivity may include a connection via telephone, an Internet connection, satellite, and/or a cable network, such as a cable network owned or leased by a content provider. The central data store 105 may communicatively connect to the home interface 105 via an A/V data aggregator 235 of the data acquisition and home interface 110. As will be discussed in further detail below, the data aggregator 235 receives information related to the behavior and identification of A/V devices 120 with which users interact, and forwards such information on to the central data store 105. To bridge the communicative gap between the data acquisition and home interface 110 and the A/V devices 120, the example wireless interfaces 115 of FIG. 2 are employed.

Signals from the various standard A/V devices, such as the set-top box 220, are typically hardwired directly into a viewer's standard television set (e.g., a television set plugged in to an electrical power outlet and connected to a co-axial data cable). However, viewers having mobile televisions, for example, generally employ the use of a wireless access point (WAP) to retransmit the television signal wirelessly throughout the viewer's home. An additional example may include household users with standard television sets that simply relocate the television from one location to another location within the home. Rather than moving both the A/V data aggregator 235 and the television together, the example wireless interface 115 permits the A/V data aggregator 235 functionality without concern for its proximity to the television. Furthermore, the wireless interface 115 permits the A/V data aggregator 235, as well as one or more devices of the wireless interface 115 itself, to be located anywhere within the home, such as a basement, attic, closet, etc. The WAP may include 802.11a/b/g communication capabilities, thereby permitting any signal from the data acquisition and home interface 110 to permeate throughout the viewer's home or business. Similarly, the A/V devices 120 (e.g., a mobile television) in a viewer's home may also include an ability to receive the transmitted signal (e.g., 802.11a/b/g).

Data acquisition in users' homes in which a standard wire-based television is viewed typically employ a hardwire connection from a wired A/V device (e.g., a set-top box) directly to a non-mobile (standard) television. Additionally, the wired A/V device (e.g., a set-top box) typically includes a hard-wired connection to a data-aggregator so that when the viewer changes the channel on the set-top box, the viewer sees the results on the television, and the changes are captured by the data aggregator. Furthermore, data acquisition in viewers' homes using standard televisions typically included a hard-wired ID device to determine which member of a household was watching or interacting with the standard A/V device. Each member of the household generally had an identification button on the ID device, or if the ID device included an IR remote control, each member pressed an appropriate button on the IR remote control to identify who was watching the television. However, because a viewer of a standard or mobile television may be in any room of the house or business, hard-wired ID devices and hard-wired data will not allow for data acquisition or identification of the viewer.

A/V device mobility (e.g., standard televisions, wireless televisions, etc.), data acquisition of the user, and user identification is accomplished, in part, by the example A/V interface 115 shown in FIG. 2. As briefly described above, the example A/V interface 115 includes the wireless user identifier (WUI) 240, the wireless access point (WAP) 245, and the wireless microphone receiver (WMR) 250. Generally speaking, signals transmitted by wire-based A/V devices (e.g., set-top box 220, video game console 225, DVD player 230, etc.) are received by the WUI 240, which, in turn, integrate a bitmap image overlay on a video channel. The bitmap image may be a message requesting that the viewer provide immediate identification information. The WUI 240 forwards the integrated A/V signal to the WAP 245 to modulate the A/V signal received by the WUI 240 (including the bitmap overlay) for wireless retransmission to an A/V device 255, as shown by a dashed arrow labeled 1. The A/V device 255, such as the example mobile television shown in FIG. 2, receives and demodulates the retransmitted signal back in to the A/V domain and presents the signal in an audio and/or video format to the viewer (e.g., a movie, television program, etc.).

A user or viewer of the example mobile television 255 views the integrated bitmap, which requests that the user provide identification information. For example, after a viewer begins using an A/V device 220, 225, 230, the WUI 240 transmits a video overlay stating, "Please select your identification button." The user may provide such identification feedback via a remote control, such as an example infrared (IR) remote control 285 shown in FIG. 2. The IR remote 285 contains user identification (ID) buttons for each of the viewers in the household (e.g., one button for each of "Jack," "Jane," and "Junior"), and transmits ID selection information from the IR remote 285 to an IR receiver 280 of the MDI 270, discussed in further detail below. The IR remote 285 may include other functionality to control the example mobile television 255 by transmitting control commands to the IR receiver 265 of the mobile television 255. Such control may include, but is not limited to, changing channels, adjusting volume, and on/off power control. User ID information may additionally or alternatively be provided by user ID buttons located on the MDI 270.

User ID selection information is wirelessly transmitted from the MDI 270 to the WUI 240, as shown by a dashed arrow labeled 2. The user ID selection information is transmitted from the WUI 240 to the A/V data aggregator 235, and the WUI 240 removes the integrated bitmap image overlay on the video channel. After a predetermined amount of time, the WUI 240 may again apply the bitmap overlay image on the video signal to reconfirm who is using the mobile A/V device 255.

Various watermarks embedded within the audio of the programming content presented on the mobile A/V device 255 emanate from one or more speakers 260. The audio watermark is imperceptible to the listener, and is received by the microphone 275 of the MDI 270. The audio signal received by the microphone 275 is RF modulated by the MDI 270 and transmitted to the WMR 250, as shown by the dashed arrow labeled 3. Alternatively, persons of ordinary skill in the art will appreciate that the audio signal may exit the mobile A/V device 255 as an electrical signal rather than an audible speaker output. For example, the mobile A/V device 255 audio output may include RCA terminals (also referred-to as RCA jacks, phono plugs, etc.) to accommodate audio cables that connect to an audio input of the MDI 270. Persons of ordinary skill in the art will also appreciate that the watermarks may be embedded within the video signal rather than, or in addition to, the audio signal. Modulated RF signals received at the WMR 250 are demodulated to extract watermark information before sending the watermarks to the A/V data aggregator 235 of the data acquisition and home interface 110.

Although the A/V data aggregator 235 could simply receive such audio signals containing the embedded watermarks directly from the devices (220, 225, 230), or directly from the WAP 245, receiving the audio signals after they have been emitted by speakers 260 on an A/V device, such as the example mobile television 255, ensures the information provided to users of the audience measurement devices is a reflection of viewer behavior and actual content displayed by the mobile A/V device 255. For example, if the A/V data aggregator 235 received the audio signals directly from the set-top box 220, video game console 225, or the DVD player 230, then the received information may not reflect a viewer's interaction with the A/V device 255. Such a situation is particularly problematic if the A/V device is a mobile television that is not powered on, but the set-top box 220 may continue to transmit directly to the A/V data aggregator 235 (assuming a hard-wired connection directly from the set-top box 220 to the A/V data aggregator 235). Alternatively, such a situation is also problematic if the set-top box 220 is powered-on and transmitting its signal through the WUI 240 and further retransmitted by the WAP 245, but the viewer of the example mobile television 255 is, instead, tuned-in to a local television station. As such, retransmission of the audio signals (including the embedded watermarks) from the television 255 ensures that information received by the A/V data aggregator 235 is indicative of viewer behavior and indicative of content actually displayed by the television 255.

The information collected regarding the user's viewing behavior and demographics may be stored locally in the A/V data aggregator 235. At pre-determined intervals, or upon external request to acquire data, the information collected from the A/V data aggregator 235 is sent by the data acquisition and home interface 110 to the central data store 105 to process and determine ratings information.

Figure 3:
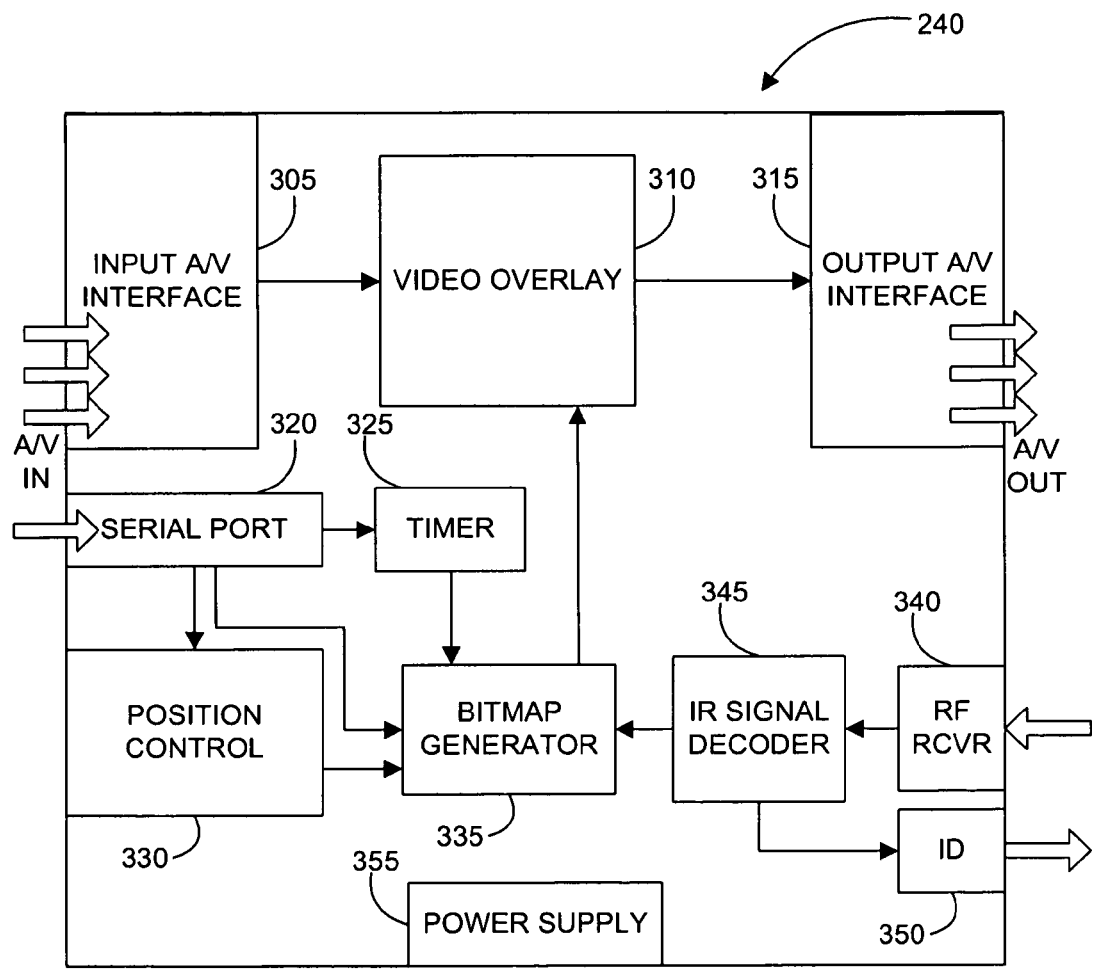
FIG. 3 is a block diagram of an example wireless user identifier (WUI) of FIG. 2 that queries users A/V devices and receives user responses to the queries.

The example WUI 240 of the wireless interface 115 of FIG. 2 is shown in greater detail in FIG. 3. A/V signals from the A/V devices (220, 225, 230) are received by an input A/V interface 305 and mixed with a bitmap (to accommodate the functionality of prompting for the user or viewer ID) at a video overlay 310 before being retransmitted to an output A/V interface 315. A/V signals from the output A/V interface 315 continue to the WAP 245 for retransmission to the A/V devices 120, as discussed above. The example WUI 240 of FIG. 3 also includes a serial port 320 to allow control of a timer 325, control of a bitmap position control 330, and addition/deletion of a library of various bitmaps in a bitmap generator 335. Access to the serial port 320 may occur as needed, and typically occurs once during WUI 240 set-up prior to installation in a user's home. For example, a technician may program the WUI 240 to contain several different bitmap images, one for each member of a household. One of the five bitmaps may be a message stating, for example, "Mr. Smith, is that you?" or "Viewer, please identify yourself" The technician may also program the timer 325 to re-display the bitmap image at a predetermined interval of, for example, 44 minutes to confirm which member of the household is viewing the television. At an expiration of the time interval, the timer 325 provides a trigger signal to the bitmap generator 335 to forward a bitmap to the video overlay 310. Furthermore, the technician may program the position control module 330 to place each of the bitmap images on a particular coordinate of the television.

The A/V signal from the output A/V interface 315, which includes the embedded bitmap, is received by at least one of the A/V devices 120 (after retransmission by the WAP 245). After the user/viewer responds to the request for identification (e.g., "Viewer, please identify yourself"), as discussed in further detail below, an RF signal containing viewer identification is received by an RF receiver 340. The RF receiver demodulates the RF signal and forwards it to an IR signal decoder 345 to extract identification information. For example, the IR signal decoder 345 parses the received signal for the presence of an ID signal of one of the members of the household, such as Mr. Smith. Upon confirming that Mr. Smith, or any other member of the household, provided identification information, the IR signal decoder 345 signals to the bitmap generator 335 that the image may be removed from the viewer's A/V device. Additionally, the IR signal decoder 345 provides the extracted identification information to an ID output interface 350. As shown in FIG. 2, the ID output interface 350 connects to an "ID Info" cable and provides such viewer identification information to the A/V data aggregator 235. The example WUI 240 of FIG. 3 may be implemented in hardware and powered by a power supply 355, such as a standard AC/DC converter. The example WUI 240 of FIG. 3 may also be implemented in software as machine readable instructions executed by: (a) a processor such as the processor 1512 shown in the example computer 1500 discussed below in connection with FIG. 15, (b) a controller, and/or (c) any other suitable processing device.

Figure 4:
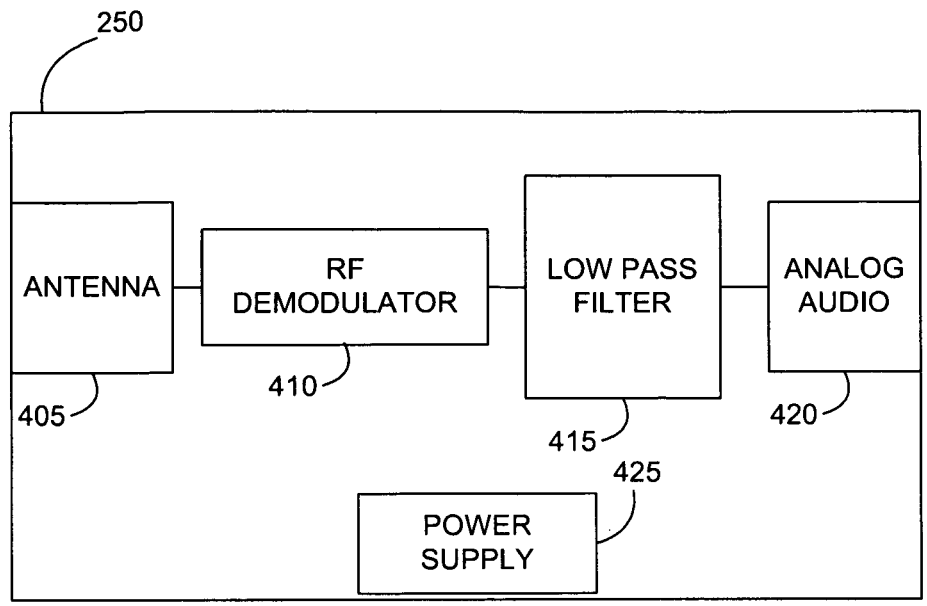
FIG. 4 is a block diagram of an example wireless microphone receiver (WMR) of FIG. 2 that receives modulated RF signals and converts them to audio signals.

The example WMR 250 of the wireless interface 115 of FIG. 2 is shown in greater detail in FIG. 4. Retransmitted audio signals sent by the wireless A/V devices, as discussed in further detail below, include embedded watermarks. As shown in FIG. 4, the WMR 250 includes an antenna 405 to receive the retransmitted audio signal and an RF demodulator 410 to demodulate the retransmitted RF signal. A low pass filter 415 converts the demodulated digital signal to an analog audio signal, which is passed to an analog audio output interface 420 for transmission to the A/V data aggregator 235. The WMR 250 may connect to an electrical socket of the viewer's home and includes a power supply 425. Typically, the WMR 250 is located in close proximity to the user's A/V data aggregator 235, but one of ordinary skill in the art will appreciate that the WMR 250 may be integrated within the A/V data aggregator 235 as a single unit.

Figure 5:
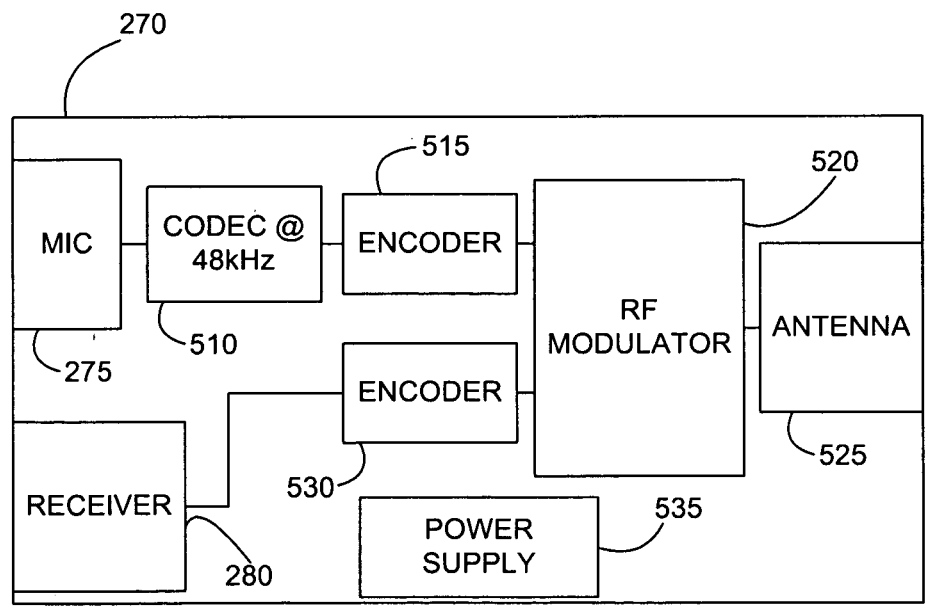
FIG. 5 is a block diagram of an example mobile device interface (MDI) of FIG. 2 that receives infrared signals and audio signals, and transmits modulated RF signals.

As shown in FIG. 5, one implementation of the MDI 270 includes the microphone 275 to receive audio signals presented by the A/V device 255, and a CODEC 510 to digitize (A/D) the received audio signals. An encoder 515 allows the digitized signal to be addressed to a particular destination, for example, the RF receiver of the WMR 250. The digitized and encoded audio is modulated by an RF modulator 520 and sent to an antenna 525 for transmission to the WMR 250. As discussed above, watermarks contained in the audio presented by the A/V device 255 are captured by the microphone 275 and wirelessly transmitted by the MDI 270 to the WUI 240. Additionally, the MDI 270 includes an IR receiver 280 to receive IR transmissions from the IR transmitter 285 (as shown in FIG. 2). The user/viewer identification selection is transmitted by the IR transmitter 285, which contains the identity of who is using the A/V device 255. Such IR transmissions are received by the IR receiver 280 and, much like the encoder 515 for the audio signal, encoded by an encoder 530 for the IR signal containing user identification information. The encoded IR signal is modulated to a radio frequency by the RF modulator 520 prior to transmission to the WUI 240. As discussed above, the WUI 240 receives and demodulates such user identification signal at an RF receiver 340, and is further decoded to identify the user and remove the bitmap overlay from the video signal transmitted to the A/V device 255.

In operation, the MDI 270 is a relatively small device with a power supply 535 (e.g., a battery), thereby allowing it to easily and unobtrusively attach to the A/V device 255. People of ordinary skill in the art will also appreciate that the MDI 270 may, alternatively, be integrated into the A/V device 255. Acoustic signals presented by the A/V device 255 are received by the microphone 275 of the MDI 270, digitized (A/D) by a CODEC 515, encoded by the encoder 515, and modulated to a radio frequency by the RF modulator 520. The modulated and encoded signal is sent to the antenna 525 for transmission to the WMR 250. As described above in view of FIG. 4, the WMR 250 includes the antenna 405 to receive the modulated RF signal transmitted by the MDI 270, demodulates it with the RF demodulator 410, converts the digital signal to analog audio with the low pass filter 415, and the analog audio output connector 420 allows various cable connections to route the audio signal to the A/V data aggregator 235. Such audio signals, including the embedded watermarks provided by network broadcasters, propagate from one or more of the A/V devices (220, 225, and 230) and are eventually provided to the A/V data aggregator 235. The embedded watermark signals of the audio signal are used by the A/V data aggregator 235, or an entity associated with the central data store 105, to determine which program a user is receiving. The receiver 280 of the MDI 270 operates to receive IR signals from a user's IR remote control 285. For example, while the IR remote control 285 may include standard control buttons/commands (e.g., channel change, volume change, power on/off, etc.), the IR remote control 285 may also include identification buttons. As described above, when the user sees a bitmap prompt such as, "Viewer, please identify yourself," the user presses an appropriate identification button on the IR remote control 285 (e.g., a button labeled "Jane"). The identification signal from the IR remote control 285 is received by the receiver 280 of the MDI 270 prior to being encoded by the encoder 515. Much like the audio signal received by the microphone 275, the encoded IR signal is modulated to a radio frequency by the RF modulator 520 before being sent to the antenna 525 for transmission to the WUI 240.

Figure 6:
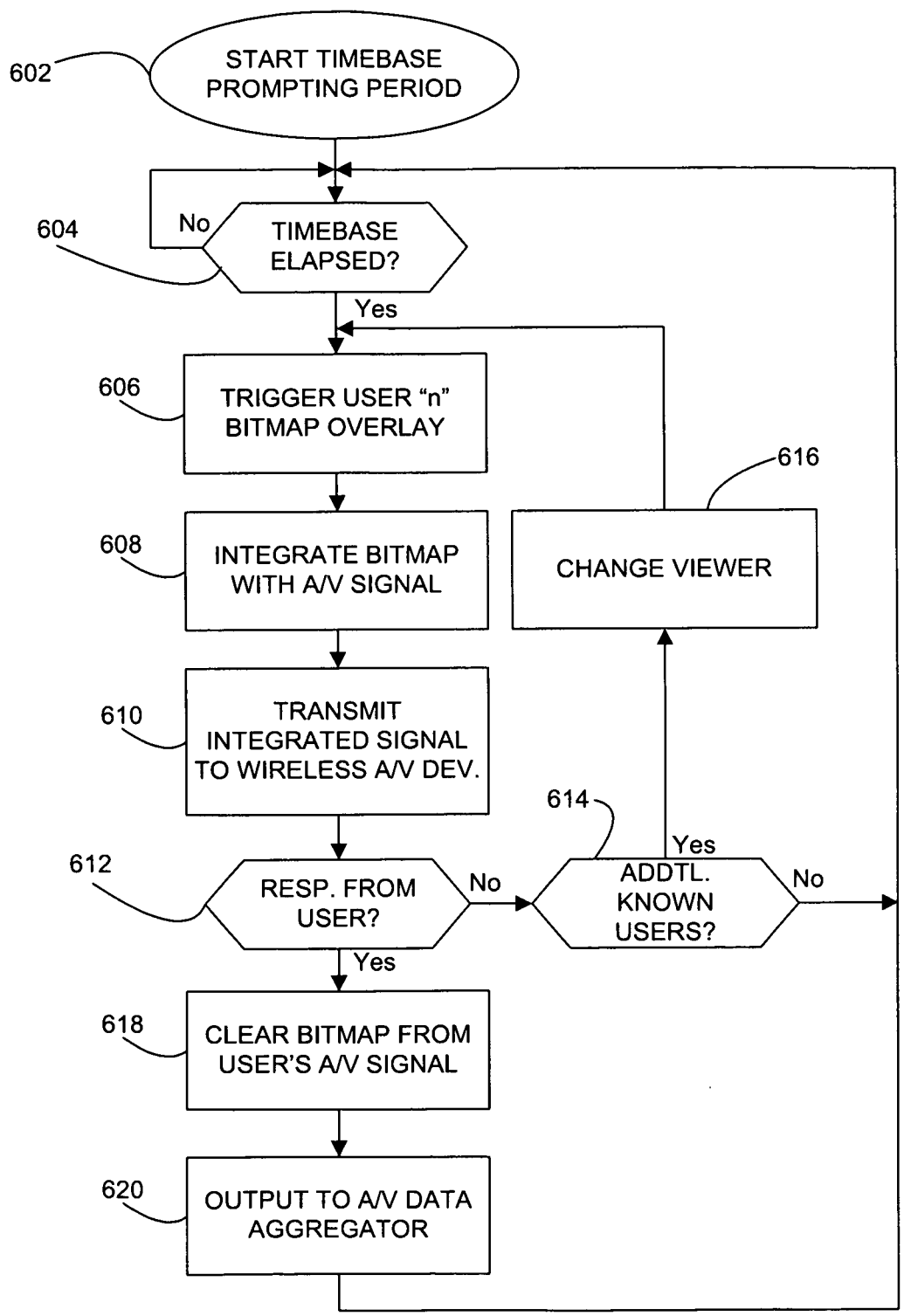
FIG. 6 is a flowchart representing an example process for implementing the metering system of FIGS. 1-5.

A flowchart representative of example machine readable instructions for implementing the example system to wirelessly meter an A/V device of FIGS. 1-5 is shown in FIG. 6. In this example, the machine readable instructions comprise a program for execution by: (a) a processor such as the processor 1512 shown in the example computer 1500 discussed below in connection with FIG. 15, (b) a controller, and/or (c) any other suitable processing device. The program may be embodied in software stored on a tangible medium such as, for example, a flash memory, a CD-ROM, a floppy disk, a hard drive, a digital versatile disk (DVD), or a memory associated with the processor 1512, but persons of ordinary skill in the art will readily appreciate that the entire program and/or parts thereof could alternatively be executed by a device other than the processor 1512 and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented by the flowchart of FIG. 6 may be implemented manually. Further, although the example program is described with reference to the flowchart illustrated in FIG. 6, persons of ordinary skill in the art will readily appreciate that many other methods of implementing the example machine readable instructions may alternatively be used. For example, the order of execution of the blocks may be changed, and/or some of the blocks described may be changed, substituted, eliminated, or combined.

The process of FIG. 6 begins at block 602 where the A/V data aggregator 235 or WUI 240 initiates a time-based prompting period. Generally speaking, audience measurement systems and devices periodically verify whether or not a user is actively interacting with (e.g., viewing) an A/V device. Sometimes a user may begin watching a program, a DVD, or playing a game, but later walk away from the A/V device without turning it off. Periodic user reminders allow the audience measurement devices to correlate acquired data with an indication of whether the user was responsive to a 'presence query' (indicating active use) or non-responsive to a 'presence query' (indicating the A/V device may have been left on with no interactive user). The method waits (loops) if the timebase does not expire (block 604), otherwise the method prompts the bitmap generator 335 for a specific user's message to be forwarded (block 606) to the video overlay 310. For example, a memory of the bitmap generator 335 may have a number of graphics (e.g., one for each of "n" users), including a graphic that reads, "Jane, please acknowledge your presence." The video overlay 310 integrates this graphic with the A/V signals input from at least one of the various devices (220, 225, 230) at block 608. The WAP 245 receives the integrated signal and retransmits it (block 610) to the A/V device 255, where it is presented to the user. If no response is received after a predetermined amount of time after transmitting the bitmap message (block 612), the WUI 240 determines if any additional known viewers have been queried (block 614). If there are additional known viewers for a particular household, the WUI 240 may apply a bitmap prompt for a different known user (e.g., "John, please acknowledge your presence.") (block 616). Otherwise, control returns to block 604 as the A/V device 255 is treated as abandoned. After the next predetermined time period elapses, the method may repeat by prompting the bitmap generator 335 for a specific user's message to be forwarded (block 606) to the video overlay 310. One of ordinary skill in the art will appreciate that, rather than apply specific user message bitmaps, a generic message may be displayed to any user to indicate the A/V device 255 is actively being used. However, such a non-customized query may require additional "yes/no" type questions to ascertain the user's demographic information. For example, the WUI 240 may also initiate prompts stating, "Are you between the ages of 18-24?" and/or "Are you male?" etc.

A response from the user (block 612) is determined after the user presses an identification button on the IR remote 285, which is captured by the MDI 270. The MDI 270 receives the IR remote 285 signal and transmits it back to the WUI 240 as an RF signal. As described above in view of FIG. 3, the RF signal is received by the RF receiver 340 and decoded with the IR signal decoder 345. The decoder 345 then prompts the bitmap generator 335 to remove the bitmap message from the user's A/V signal (block 618). Additionally, the decoder 345 provides the user identification information to the A/V data aggregator 235 via the ID interface 350 (block 620). Control returns to block 604 and the method repeats after the next timebase elapses. One of ordinary skill in the art will appreciate that, while waiting for the next timebase to elapse (e.g., 44 minutes before the user is presented with another query message), the wireless interface 115 may continue to monitor user behavior (e.g., channel changes, volume change, device used, etc.), as well as monitor content information (e.g., watermark detection).

Persons of ordinary skill in the art will appreciate that the mobile interface 115, including the WUI 240, the WAP 245, and the WMR 250 may be combined or separated into various functional divisions without limitation. Similar to FIG. 2, an alternate example wireless interface 715 is shown in FIG. 7. Dashed arrows labeled 1 and 3 are consolidated into a single dashed arrow in FIG. 7 to represent an example consolidation of the WUI and the WMR into a single module 720. The combined WUI and WMR module 720 receives all RF signals. Alternatively, each module may remain separate, as shown in FIG. 2, while designating one of the modules to send and/or receive all wireless communication. As such, each of the separate modules may be interconnected via network cables, or similar connectivity. Also similar to FIG. 2, an alternate example wireless interface 815 is shown in FIG. 8. Dashed arrows labeled 1, 2 and 3 are consolidated into a single antenna in FIG. 8 to represent an example consolidation of the WUI, the WMR, and the WAP into a single module 820.

Figure 9:
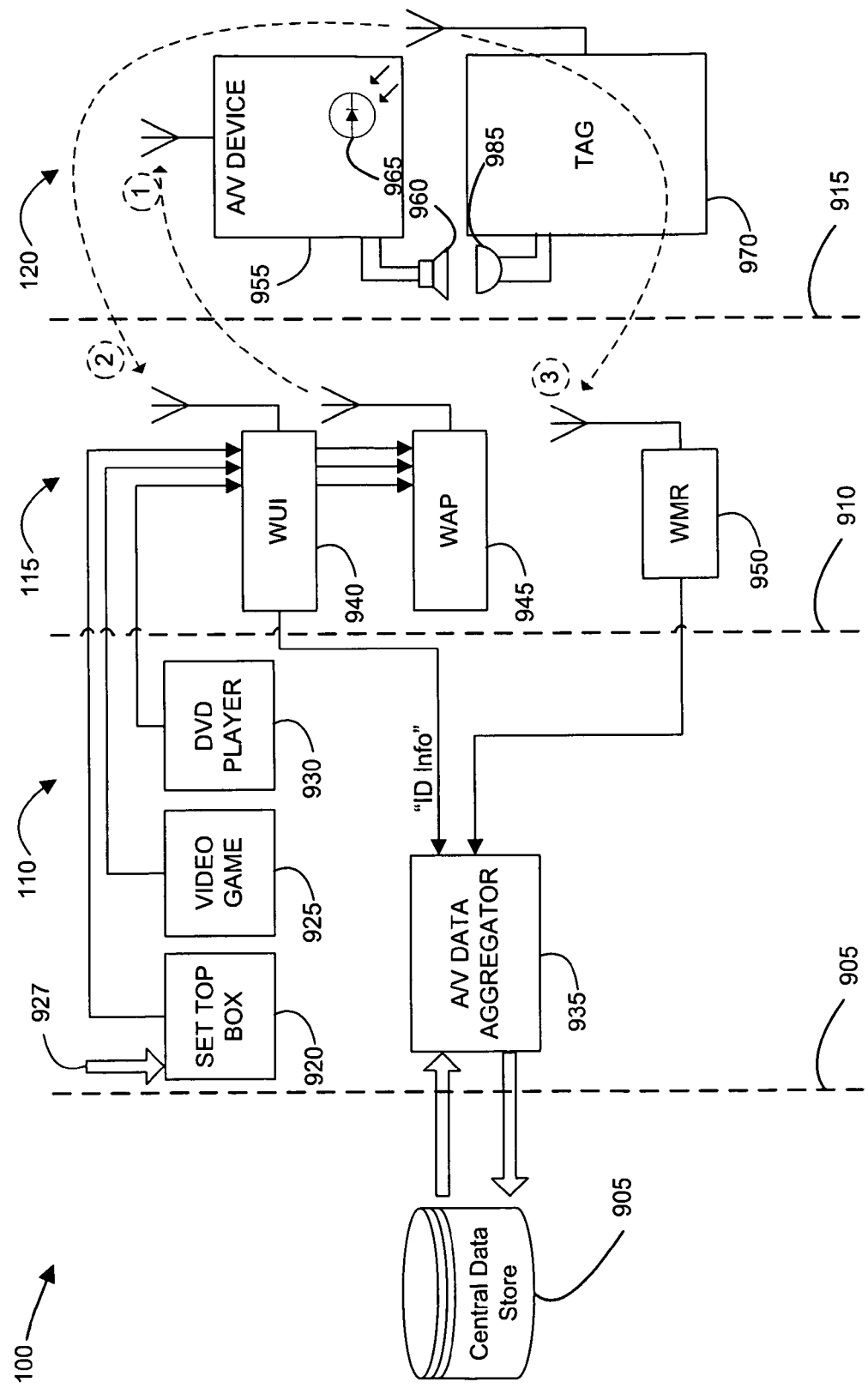
FIG. 9 is a block diagram illustrating an alternate example implementation of the system of FIG. 1.

FIG. 9 illustrates a block diagram of an alternate example system 100 to wirelessly meter an A/V device of FIG. 1. FIG. 9 is the same as FIG. 2 except for a personalized tag 970 in lieu of the MDI (identifier 270 of FIG. 2) and an alternate WUI 940, as will be discussed below. All other components of FIG. 9 that are similar to FIG. 2 are provided similar identification numbers in a "900" series. Generally speaking, rather than employing a bitmap overlay on the A/V signal to elicit a user response, the WUI 940 inserts an imperceptible audio watermark in the A/V signal that is transmitted by the WUI 940 to the A/V device 955. Note that the watermark added by the WUI 940 is in addition to any watermarks that may be added by network broadcasters for a purpose of content identification, or otherwise. As such, the WMR 950 operates in the same manner as the WMR 250 of FIG. 2, thus unaffected by the alternate example system 100 to wirelessly meter an A/V device of FIG. 9. The personalized tag 970 is carried by the user or, due to its small size, conveniently attached to the A/V device 955. As shown in FIG. 9, a microphone in the tag 970 picks up audio output from the A/V device 955, including the imperceptible watermark, and transmits that signal, plus an added identification signal, back to the WUI 940. If the WUI 940 receives the watermark that includes the added identification signal injected by the tag 970, the WUI 940 automatically provides the A/V data aggregator 935 with user demographic information, thereby eliminating a need to receive a manual prompt from the user to provide identification. The overlay bitmap instructions to the user, and subsequent user response, are effectively eliminated with the alternate example system 100 to wirelessly meter an A/V device of FIG. 9.

Figure 10:
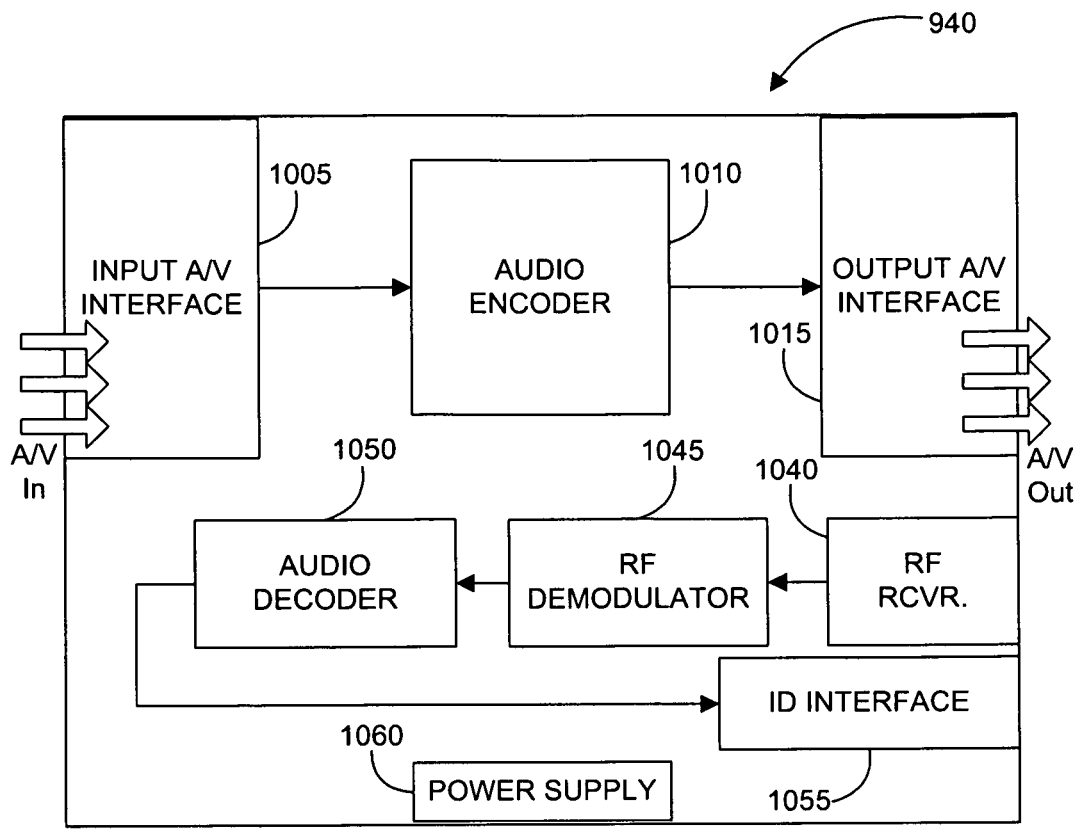
FIG. 10 is a block diagram of an example alternate wireless user identifier (WUI) of FIG. 9.

FIG. 10 is a more detailed view of the example WUI 940 of FIG. 9. Similar to FIG. 3, the A/V signal passes through the WUI 940 via an input A/V interface 1005 and an output A/V interface 1015, just as it did in the example WUI 240 of FIG. 3. However, rather than inject a bitmap overlay on to the video signal, the example WUI 940 adds a personalized watermark signal to the audio portion of the A/V signal with an audio encoder 1010. The A/V signal continues to the WAP 945 where it is transmitted to the A/V device 955. Audio output from the A/V device 955 is picked-up by the microphone(s) 985 of the tag 970 which re-transmits the audio signal with the embedded watermark and the new identification code, as will be discussed in further detail below. When the personalized tag 970 transmits its RF modulated signal, the WUI 940 decodes and receives it with an RF receiver 1040, and demodulates it with an RF demodulator 1045. An audio decoder 1050 looks for the watermark that it originally added to the audio signal and, if the watermark is detected, the WUI 940 generates a signal to the A/V data aggregator 935 via an ID interface 1055 and the "ID Info" line, as shown in FIG. 9. Such signal also includes the personalized identification code added by the tag 970, thereby allowing demographic information to be correlated to user behavior. Other signals that may occupy the same transmission frequency are ignored because they are not deemed to be associated with the WUI 940.

Figure 11:
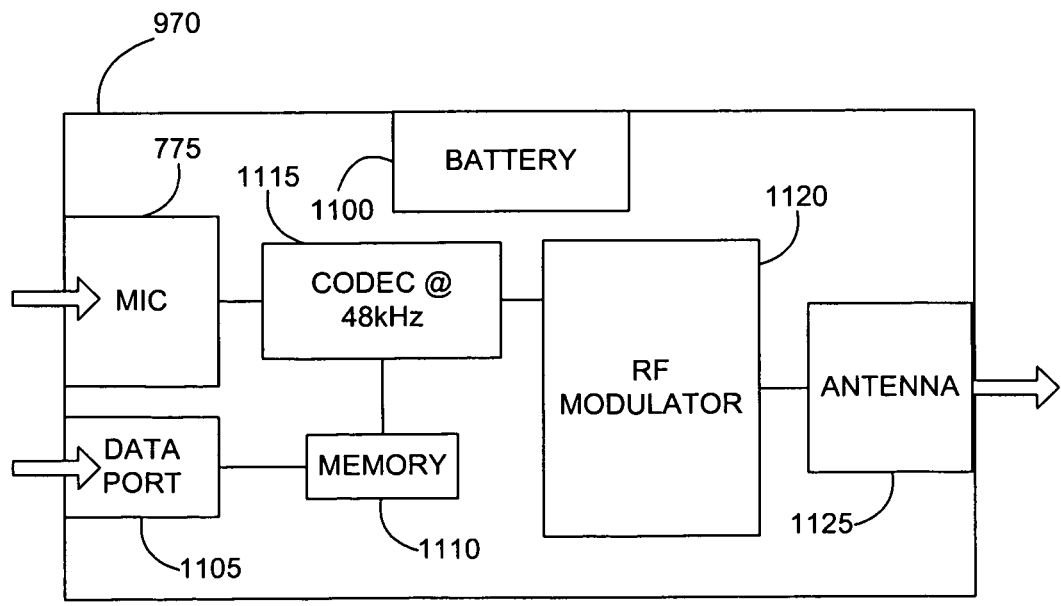
FIG. 11 is a block diagram of an example personalized tag of FIG. 9 that receives audio signals, includes a personalized code with the audio signals, and transmits modulated RF signals.

FIG. 11 is a more detailed view of the example tag 970 of FIG. 9. The personalized tag 970 is a small battery 1100 operated device that may easily and unobtrusively attach to the A/V device 955. Alternatively, the personalized tag 970 may be carried by the user in a shirt pocket, clothing clip, or hung around the user's neck on a strap while using the A/V device 955. Inputs to the tag 970 include audio from the microphone 785 and tag configuration data via a data port 1105. Before the tag 970 is used by a user of a statistically selected household, the data port 1105 allows configuration of an identification code to be saved to a tag memory 1110. One of ordinary skill in the art will appreciate that the data port 1105 may include a serial port, network cable, wireless transceiver, or similar known data communications connection. Each identification code is unique to each statistically selected user and also saved in a database of the organization acquiring user data (e.g., Nielsen Media Research). Post processing of the collected user behavior data references the identification code to correlate the specific user demographics with the user behavior.

Audio output (including the watermarks injected by the WUI 940) by the A/V device 955 of FIG. 9 is picked-up by the microphone 775 and provided to a CODEC 1115 for digitizing (A/D conversion). The memory 1110 provides the personalized identification code to the CODEC 1115 so that it may be added to the digital signal modulated by an RF modulator 1120 and wirelessly transmitted via an antenna 1125. Such an identification code allows a recipient of the RF modulated signal to identify which user is using the A/V device 955.

Figure 12:
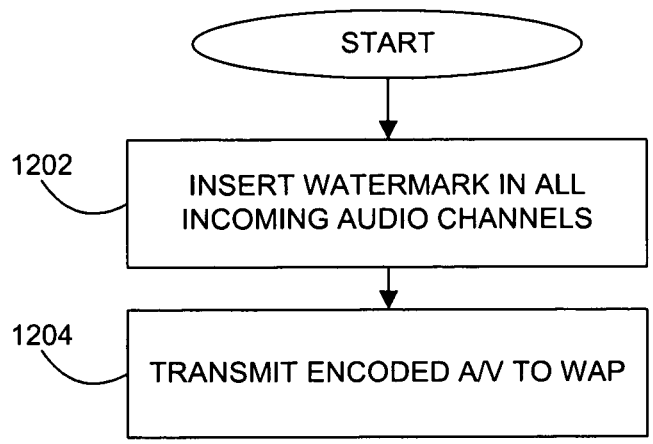
FIG. 12 is a flowchart representing an example process for implementing signal transmission for the alternate example wireless user identifier (WUI) of FIG. 10.

A flowchart representative of example machine readable instructions for implementing the alternate WUI 940 of FIG. 10 is shown in FIG. 12. Although the example program is described with reference to the flowchart illustrated in FIG. 12, persons of ordinary skill in the art will readily appreciate that many other methods of implementing the example machine readable instructions may alternatively be used. For example, the order of execution of the blocks may be changed, and/or some of the blocks described may be changed, substituted, eliminated, or combined.

The program of FIG. 12 begins at block 1202 where the WUI 940 inserts a watermark in all incoming audio of an A/V signal received from the devices (e.g., 920, 925, 930). The encoded A/V signal is transmitted to the WAP 945 (block 1204) where it is further transmitted to an A/V device, such as a standard television or an example wireless television 955 of FIG. 9.

Figure 13:
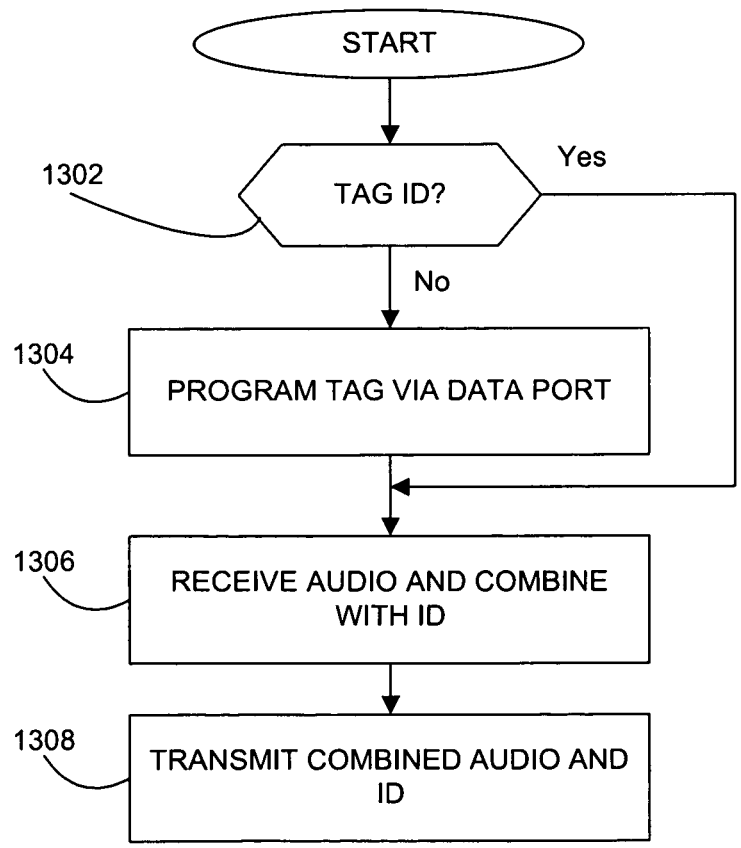
FIG. 13 is a flowchart representing an example process for implementing the example personalized tag of FIG. 11.

A flowchart representative of example machine readable instructions for implementing the tag 970 of FIG. 11 is shown in FIG. 13. The program of FIG. 13 begins at block 1302 where the tag 970 determines if it is associated with an ID. If the tag does not have an ID in the memory 1110, an ID is programmed into the memory 1110 at block 1304. A technician may access the memory 1110 via the data port 1105 to program a predetermined ID for at least one member of a household for which the tag 970 will be used. After the tag 970 is associated with an ID, or if the tag 970 already has an associated ID, program control advances to block 1306. If the tag 970 is within audible proximity to the A/V device 955, the microphone 775 will receive the audio signals from the A/V device speakers, including the embedded watermark containing the personalized identification code from the WUI 940. Additionally, the tag 970 combines or modulates received audio with the ID via the CODEC 1115. At block 1308, the combined audio is RF modulated by the RF modulator 1120 and transmitted via the antenna 1125. The signal transmitted at block 1308 includes both the personalized identification code combined by the tag 970, the personalized identification code from the WUI 940, and any other embedded watermarks (e.g., from a network broadcaster containing program identification information). The behavior of the WMR 950 does not differ from that discussed earlier in view of FIG. 2, and will not be repeated here.

Figure 14:
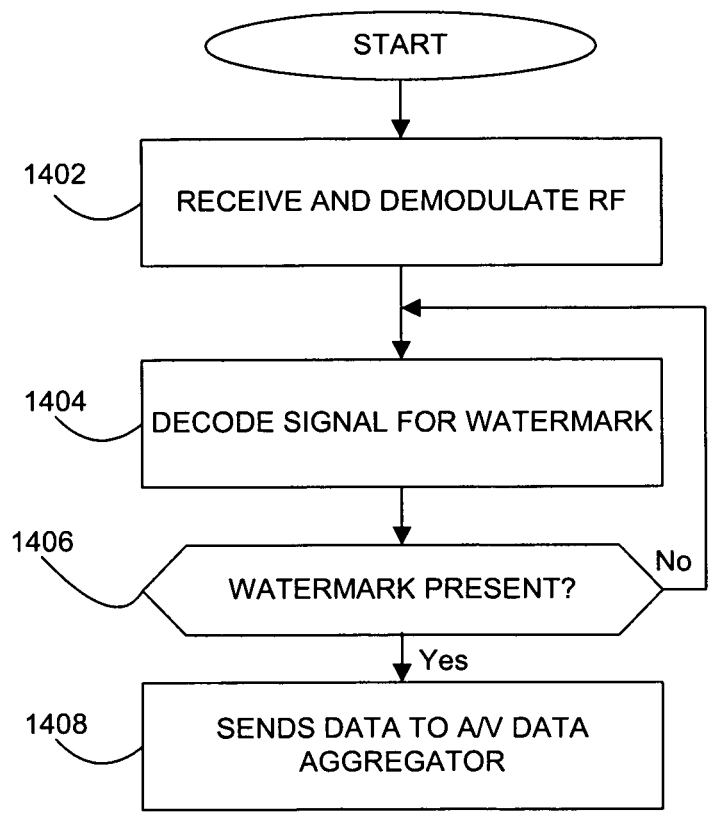
FIG. 14 is a flowchart representing an example process for implementing signal reception and watermark detection of the alternate example wireless user identifier (WUI) of FIG. 10.

FIG. 14 is a flowchart representative of example machine readable instructions for implementing the alternate WUI 940 of FIG. 10. Unlike the flowchart of FIG. 12, which generally described an example of A/V signal throughput from A/V devices (e.g., the set-top box 920), the flowchart of FIG. 14 illustrates example signal receipt by the WUI 940. The WUI 940 receives and demodulates RF signals with the RF receiver 1040 and RF demodulator 1045, respectively, at block 1402. The audio decoder 1050 decodes the demodulated signal at block 1404, and if the personalized watermark, which was earlier embedded by the WUI 940 before transmission to the A/V device 955, is not detected at block 1406, program control advances to block 1404 to continue searching for the personalized watermark. If the personalized watermark is detected at block 1406, indicating that the personalized tag 970 for a household viewer is viewing an A/V device, the identification information is forwarded to the ID interface 1055 at block 1408.

As shown by FIGS. 12-14, if the viewer is not watching the television 955, or has stepped out of the room from which the television 955 was located, the tag 970 will not transmit the embedded ID. In such a situation, the tag 970 properly prevents invalid viewing data from being recorded and/or forwarded to the A/V data aggregator 935. However, if the viewer returns to a viewing proximity of the television 955, the tag 970 carried by that viewer may again receive the audio signals from the television speakers with the tag microphone 985. Because the tag 970 automatically and passively identifies the viewer of the television 955, the example alternate wireless interface of FIGS. 9-11 effectively eliminate the need for the viewer to manually respond to visual cues in order to provide identification information to the A/V data aggregator 935.

Figure 15:
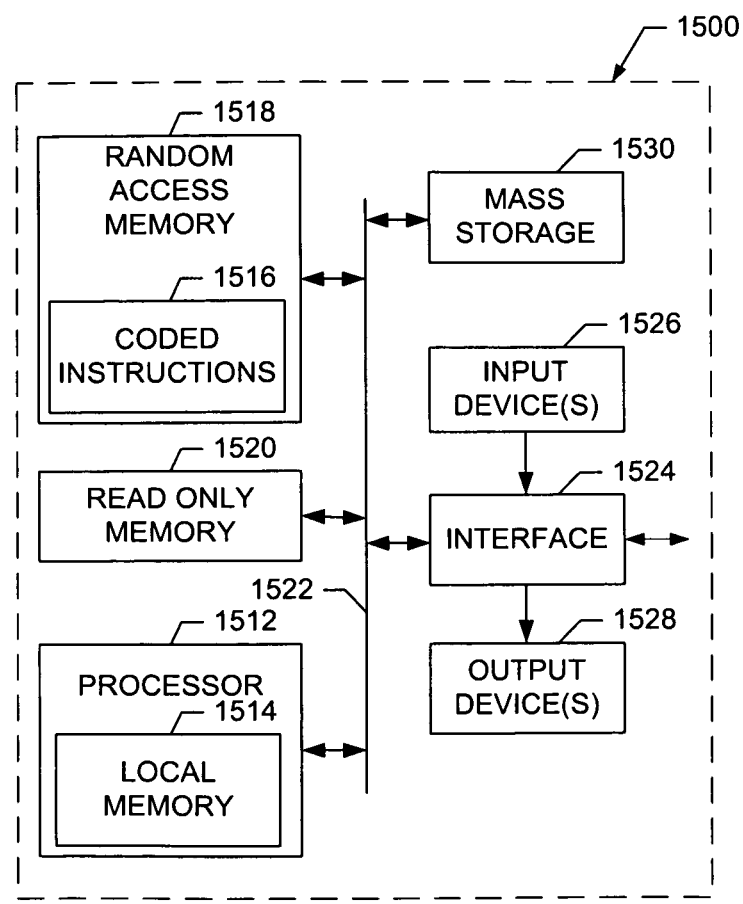
FIG. 15 is a schematic illustration of an example processor system that may execute the processes of FIGS. 6 and 12-14 to implement the audience measurement systems shown in FIGS. 1-5, 7, 8, and 9-11, respectively.

FIG. 15 is a block diagram of an example computer 1500 capable of implementing the apparatus and methods disclosed herein. The computer 1500 can be, for example, a server, a personal computer, a set top box, or any other type of computing device. The system 1500 of the instant example includes a processor 1512 such as a general purpose programmable processor. The processor 1512 includes a local memory 1514, and executes coded instructions 1516 present in the local memory 1514 and/or in another memory device. The processor 1512 may execute, among other things, the example machine readable instructions illustrated in FIGS. 6 and 12-14. The processor 1512 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1512 is in communication with a main memory including a volatile memory 1518 and a non-volatile memory 1520 via a bus 1522. The volatile memory 1518 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1520 may be implemented by flash memory and/or any other desired type of memory device. Access to the main memory 1518, 1520 is typically controlled by a memory controller (not shown) in a conventional manner.

The computer 1500 also includes a conventional interface circuit 1524. The interface circuit 1524 may be implemented by any type of well known interface standard, such as an Ethernet interface, a universal serial bus (USB), and/or a third generation input/output (3GIO) interface.

One or more input devices 1526 are connected to the interface circuit 1524. The input device(s) 1526 permit a user to enter data and commands into the processor 1512. The input device(s) can be implemented by, for example, a keyboard, a mouse, a touchscreen, a track-pad, a trackball, isopoint and/or a voice recognition system.

One or more output devices 1528 are also connected to the interface circuit 1524. The output devices 1528 can be implemented, for example, by display devices (e.g., a liquid crystal display, a cathode ray tube display (CRT), a printer and/or speakers). The interface circuit 1524, thus, typically includes a graphics driver card.

The interface circuit 1524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1500 also includes one or more mass storage devices 1530 for storing software and data. Examples of such mass storage devices 1530 include floppy disk drives, hard drive disks, compact disk drives and digital versatile disk (DVD) drives.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

I claim:

1. A method to identify a source of media activity, comprising:

embedding, at a household, a first watermark in media received from a household media device;

wirelessly retransmitting the media with the first watermark to a portable television via a wireless access point at the household;

acoustically receiving audio-based media emanating from the portable television at the household; and determining whether the audio-based media acoustically received from the portable television is sourced from the household media device or a local television station based on whether the audio-based media includes the first watermark embedded at the household.

2. A method as defined in claim 1, wherein the media comprises an audio/visual (A/V) signal having an audio portion and a video portion.

3. A method as defined in claim 2, wherein the A/V signal is at least one of a set-top box A/V signal, a video game console A/V signal, a video cassette recorder (VCR) A/V signal, a digital video recorder (DVR) A/V signal, or a digital versatile disk (DVD) A/V signal.

4. A method as defined in claim 2, wherein the A/V signal is converted to a radio frequency (RF) signal.

5. A method as defined in claim 4, wherein the RF signal is transmitted as an 802.11 compliant signal.

6. A method as defined in claim 1, further comprising detecting a second watermark in the retransmitted media, the second watermark associated with broadcaster generated media identification information.

7. A method as defined in claim 1, further comprising ignoring the audio-based media emanating from the portable television when the first watermark is absent.

8. A tangible machine readable storage device or storage disk comprising machine accessible instructions that, when executed, cause a machine to, at least:

embed, at a household, a first watermark in media received from a media device located at the household;

wirelessly retransmit the first media and the first watermark to a portable television via a wireless access point at the household;

acoustically receive audio-based media emanating from the portable television at the household; and determine whether the audio-based media acoustically received from the portable television is sourced from the household media device or a source external to the household based on whether the audio-based media includes the first watermark embedded at the household.

9. A machine readable storage device or storage disk as defined in claim 8, wherein the machine accessible instructions further cause the machine to receive the media as an audio/visual (A/V) signal having an audio portion and a video portion.

10. A machine readable storage device or storage disk as defined in claim 9, wherein the machine accessible instructions further cause the machine to receive the A/V signal as at least one of a set-top box A/V signal, a video game console A/V signal, a video cassette recorder (VCR) A/V signal, a digital video recorder (DVR) A/V signal, or a digital versatile disk (DVD) A/V signal.

11. A machine readable storage device or storage disk as defined in claim 9, wherein the machine accessible instructions further cause the machine to convert the A/V signal to a radio frequency (RF) signal.

12. A machine readable storage device or storage disk as defined in claim 9, wherein the machine accessible instructions further cause the machine to transmit a radio frequency (RF) signal as an 802.11 compliant signal.

13. A machine readable storage device or storage disk as defined in claim 8, wherein the machine accessible instructions further cause the machine to detect a second watermark in the audio-based media emanating from the portable television, the second watermark associated with broadcaster generated media identification information.

14. A machine readable storage device or storage disk as defined in claim 8, wherein the machine accessible instructions further cause the machine to ignore the audio-based media emanating from the portable television when the first watermark is absent.

15. A system to distinguish media from a household media source from media from an external media source, comprising:

a wireless interface to embed, at a household, a watermark in media received from a household media device, and to wirelessly retransmit the watermark and the media from a transmission point within the household and to a portable television also within the household; and a mobile device interface to acoustically receive audio-based media emanating from the portable television within the household and, to determine whether the audio-based media acoustically received from the portable television is sourced from the household media device or the external media source based on whether the audio-based media includes the first watermark which was embedded at the household.

16. A system as defined in claim 15, wherein the household media device provides the media and comprises at least one of a set-top box, a video game console, a digital versatile disk (DVD) player, a digital video recorder (DVR), or a video cassette recorder (VCR).

17. A system as defined in claim 15, wherein the wireless interface comprises a radio frequency (RF) receiver to receive a signal indicative of audience member identity.

18. A system as defined in claim 15, wherein the wireless interface comprises a wireless access point to convert the media to a radio frequency (RF) signal.

19. A system as defined in claim 15, wherein the mobile device interface comprises a microphone to receive an audio signal from the portable television.

20. A system as defined in claim 19, wherein the mobile device interface comprises an infra-red (IR) receiver to receive an IR signal from an audience remote control.

21. A system as defined in claim 20, wherein the mobile device interface comprises a radio frequency (RF) modulator to modulate at least one of the audio signal or the IR signal to an RF signal.

22. A system as defined in claim 15, wherein the wireless interface comprises a wireless microphone receiver to receive a radio frequency (RF) signal from the mobile device interface.

23. A system as defined in claim 22, wherein the wireless microphone receiver comprises an RF demodulator to demodulate the received RF signal, the demodulated signal to be transmitted to a data acquisition interface.

24. A system as defined in claim 15 further comprising a central data store to receive audience behavior data from a data acquisition interface.

25. A system as defined in claim 15 wherein the wireless interface comprises one or more of a wireless access point, a wireless user identifier (WUI), and a wireless microphone receiving device.

26. A system as defined in claim 25 wherein the wireless access point comprises a transmitter and receiver to transmit and receive audio-visual signals via an 802.11-type format.

27. A system as defined in claim 25 wherein the WUI comprises at least one of a radio frequency (RF) receiver, or an RF to infra-red (IR) converter.

28. A system as defined in claim 27, wherein the WUI is a peoplemeter.

* * * * *